US009756622B2

(12) United States Patent
Takeda et al.

(10) Patent No.: US 9,756,622 B2
(45) Date of Patent: Sep. 5, 2017

(54) RADIO BASE STATION, USER TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 192 days.

(21) Appl. No.: 14/398,985

(22) PCT Filed: May 9, 2013

(86) PCT No.: PCT/JP2013/062993
§ 371 (c)(1),
(2) Date: Nov. 5, 2014

(87) PCT Pub. No.: WO2013/168750
PCT Pub. Date: Nov. 14, 2013

(65) Prior Publication Data
US 2015/0110031 A1    Apr. 23, 2015

(30) Foreign Application Priority Data
May 9, 2012    (JP) ................................ 2012-107921

(51) Int. Cl.
*H04W 72/04*        (2009.01)
*H04L 5/00*         (2006.01)

(52) U.S. Cl.
CPC ......... *H04W 72/042* (2013.01); *H04L 5/0053* (2013.01); *H04L 5/0037* (2013.01); *H04W 72/0453* (2013.01)

(58) Field of Classification Search
CPC ........... H04W 72/042; H04W 72/0453; H04W 72/04537; H04L 5/0053; H04L 5/003
(Continued)

(56) References Cited

U.S. PATENT DOCUMENTS

| 2011/0164585 A1* | 7/2011 | Yu ........................ H04L 5/0007 370/329 |
| 2014/0016596 A1* | 1/2014 | Kim ....................... H04L 5/001 370/329 |
| 2014/0036853 A1* | 2/2014 | Kim ....................... H04W 16/14 370/329 |

FOREIGN PATENT DOCUMENTS

WO    2009/057286 A1    5/2009

OTHER PUBLICATIONS

International Search Report for corresponding International Application No. PCT/JP2013/062993, mailed Aug. 6, 2013 (2 pages)
(Continued)

*Primary Examiner* — Kan Yuen
*Assistant Examiner* — Richard Chang
(74) *Attorney, Agent, or Firm* — Osha Liang LLP

(57) ABSTRACT

A radio base station transmits downlink control information to user terminals through enhanced PDCCHs which are frequency-division-multiplexed with a PDSCH, and includes an allocation section that allocates a plurality of enhanced PDCCH sets to each user terminal, the plurality of enhanced PDCCH sets each including a plurality of PRB pairs placed for the enhanced PDCCHs, so that at least one enhanced PDCCH set overlaps with other user terminals, and a mapping section that selects enhanced PDCCH sets from the plurality of enhanced PDCCH sets so that the number of enhanced PDCCH sets used to transmit the downlink control information in a predetermined time resource unit becomes minimum, and maps the downlink control information to the PRB pairs which form the selected enhanced PDCCH sets.

7 Claims, 16 Drawing Sheets

(58) Field of Classification Search
USPC .......................................................... 370/329
See application file for complete search history.

(56) References Cited

OTHER PUBLICATIONS

Huawei et al; "UE-specific search space for ePDCCH;" 3GPP TSG RAN WG1 Meeting #68bis, R1-120998; Jeju, Korea; Mar. 26-30, 2012 (5 pages).
3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).
Office Action in the counterpart Japanese Patent Application No. 2012-107921, mailed Dec. 24, 2014 (5 pages).
Extended European Search Report issued in corresponding European Application No. 13787269.3 dated Dec. 9, 2015 (7 pages).
Office Action issued in corresponding Japanese Application No. 2012-107921, mailed May 12, 2015 (4 pages).
Office Action issued in corresponding Mexican Application No. MX/a/2014/013506, mailed Jun. 23, 2016 (4 pages).
Office Action issued in corresponding Japanese Application No. 2015-159486, mailed Jun. 14, 2016 (5 pages).
Research in Motion et al; "Support Common Control Channel in E-PDCCH;" 3GPP TSG RAN WG1 Meeting #68bis, R1-121479; Jeju, Korea; Mar. 26-30, 2012 (5 pages).
Fujitsu; "UE-specific Search Space Design for Enhanced Downlink Control Channel;" 3GPP TSG-RAN WG1 #68bis, R1-121195; Jeju, Korea; Mar. 26-30, 2012 (6 pages).

* cited by examiner

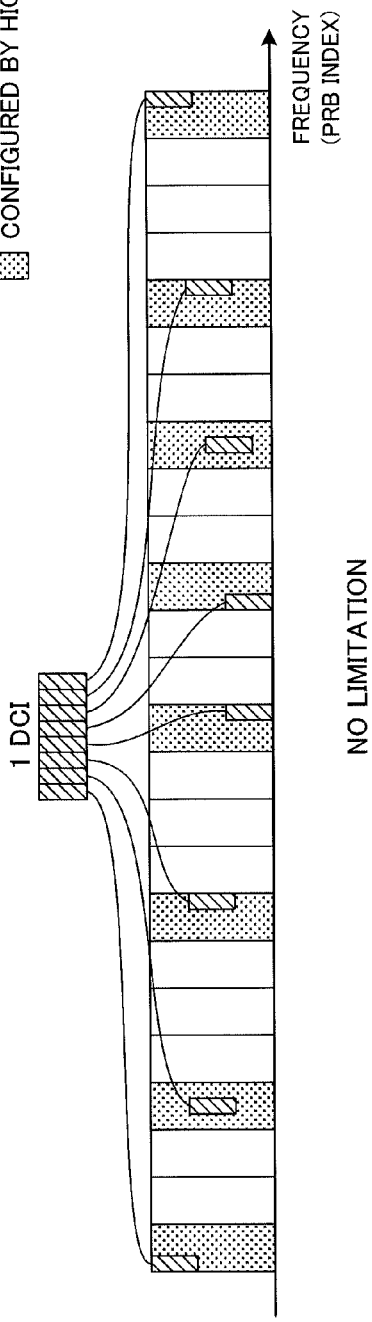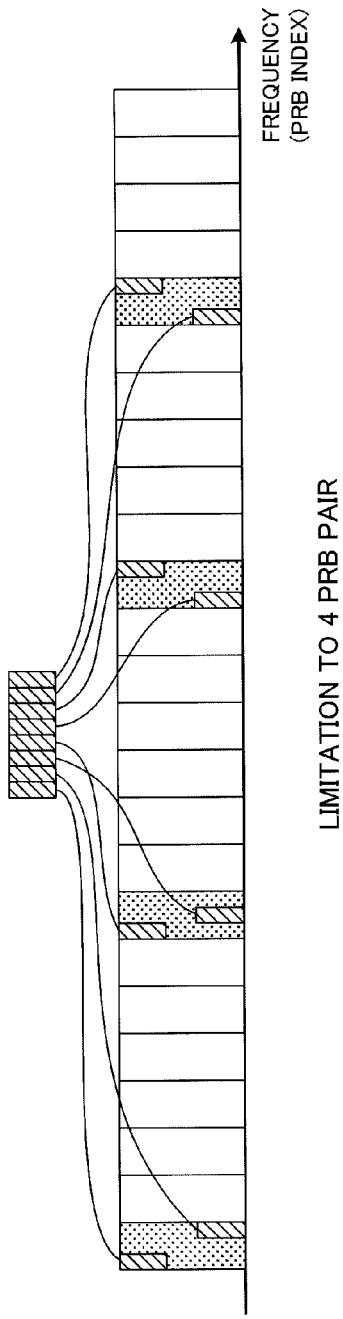

| EXAMPLE OF AGGREGATION LEVEL | |
|---|---|
| AGGREGATION LEVEL | NUMBER OF BD TRIALS |
| 1 | 6 |
| 2 | 6 |
| 4 | 2 |
| 8 | 2 |
| TOTAL | 16 |

| AGGREGATION LEVEL | NUMBER OF BD TRIALS | |
|---|---|---|
| | ENHANCED PDCCH SET #x | ENHANCED PDCCH SET #y |
| 1 | 3 | 3 |
| 2 | 3 | 3 |
| 4 | 1 | 1 |
| 8 | 1 | 1 |
| TOTAL | 8 | 8 |

| AGGREGATION LEVEL | NUMBER OF BD TRIALS | | |
|---|---|---|---|
| | ENHANCED PDCCH SET #1 | ENHANCED PDCCH SET #2 | ENHANCED PDCCH SET #3 |
| 1 | 2 | 2 | 2 |
| 2 | 2 | 2 | 2 |
| 4 | 1 | 1 | 0 |
| 8 | 1 | 1 | 0 |
| TOTAL | 6 | 6 | 4 |

| AGGREGATION LEVEL | NUMBER OF BD TRIALS | |
|---|---|---|
| | PRIMARY SET | SECONDARY SET |
| 1 | 4 | 2 |
| 2 | 4 | 2 |
| 4 | 1 | 1 |
| 8 | 1 | 1 |
| TOTAL | 10 | 6 |

RADIO BASE STATION, USER TERMINAL, RADIO COMMUNICATION SYSTEM AND RADIO COMMUNICATION METHOD

TECHNICAL FIELD

The present invention relates to a radio base station, a user terminal, a radio communication system and a radio communication method in a next-generation radio communication system.

BACKGROUND ART

In a UMTS (Universal. Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-Advanced" or "LTE enhancement" (hereinafter referred to as "LTE-A")) are under study for the purposes of further broadbandization and increased speed beyond LTE. In LTE (Rel. 8) and LTE-A (Rel. 9 and Rel. 10), MIMO (Multi-Input Multi-Output) techniques are under study as radio communication techniques to transmit and receive data using a plurality of antennas, and improve spectral efficiency. According to MIMO techniques, a plurality of transmitting/receiving antennas are provided in the transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A, which is a successor system of LTE, multiple-user MIMO (MU-MIMO) transmission to send transmission information sequences from different transmitting antennas to different users simultaneously, is under study. This MU-MIMO transmission is also applied to a HetNet (Heterogeneous Network) and CoMP (Coordinated Multi-Point) transmission.

In future systems, the capacity of downlink control channels to transmit downlink control information is expected to run short, due to an increase in the number of users to be connected to a radio base station. Consequently, there is a threat that conventional radio resource allocation methods fail to optimize the characteristics of future systems such as MU-MIMO transmission.

As a solution to this problem, a method of expanding the radio resource region for downlink control channels and transmitting more downlink control information may be possible. In this case, how to allocate radio resources to downlink control information in the expanded radio resource region for downlink control channels becomes a problem.

The present invention has been made in view of the above, and it is therefore an object of the present invention to provide a radio base station, a user terminal, a radio communication method and a radio communication system that can adequately allocate radio resources to downlink control information in an expanded radio resource region for downlink control channels.

Solution to Problem

The radio base station of the present invention is a radio base station that transmits downlink control information to user terminals by enhanced downlink control channels which are frequency-division-multiplexed with a downlink shared data channel, and this radio base station has an allocation section that allocates a plurality of frequency resource sets to each user terminal, the plurality of frequency resource sets each including a plurality of frequency resource units placed for the enhanced downlink control channels, so that at least one frequency resource set overlaps with other user terminals; and a mapping section that selects frequency resource sets from the plurality of frequency resource sets so that the number of frequency resource sets used to transmit the downlink control information in a predetermined time resource unit becomes minimum, and maps the downlink control information to the frequency resource units which form the selected frequency resource sets.

The user terminal of the present invention is a user terminal that receives downlink control information from a radio base station by an enhanced downlink control channel which is frequency-division-multiplexed with a downlink shared data channel, and this user terminal has a receiving section that receives allocation information of a plurality of frequency resource sets each including a plurality of frequency resource units placed for the enhanced downlink control channel; and an acquisition section that blind-decodes each candidate search space for the plurality of frequency resource sets based on the allocation information, and acquires the downlink control information.

The radio communication method of the present invention is a radio communication method in a radio base station that transmits downlink control information to user terminals by enhanced downlink control channels, which are frequency-division-multiplexed with a downlink shared data channel, and this radio communication method comprising the steps of: allocating a plurality of frequency resource sets to each user terminal, the plurality of frequency resource sets each including a plurality of frequency resource units placed for the enhanced downlink control channels, so that at least one frequency resource set overlaps with other user terminals; and selecting frequency resource sets from the plurality of frequency resource sets so that the number of frequency resource sets used to transmit the downlink control information in a predetermined time resource unit becomes minimum, and mapping the downlink control information to the frequency resource units which form the selected frequency resource sets.

The radio communication system of the present invention is a radio communication system in which a radio base station transmits downlink control information to user terminals by enhanced downlink control channels, which are frequency-division-multiplexed with a downlink shared data channel, wherein: the radio base station comprises: an allocation section that allocates a plurality of frequency resource sets to each user terminal, the plurality of frequency resource sets each including a plurality of frequency resource units placed for the enhanced downlink control channels, so that at least one frequency resource set overlaps with other user terminals; and a mapping section that selects frequency resource sets from the plurality of frequency resource sets so that the number of frequency resource sets used to transmit the downlink control information in a predetermined time resource unit becomes minimum; and the user terminal comprises: a receiving section that receives allocation information of the plurality of frequency resource sets; and an acquisition section that blind-decodes each candidate search space for the plurality of frequency resource sets based on the allocation information, and acquires the downlink control information.

Advantageous Effects of Invention

According to the present invention, it is possible to provide a radio base station, a user terminal, a radio communication method and a radio communication system that can adequately allocate radio resources to downlink control information in an expanded radio resource region for downlink control channels. Especially, it is possible to prevent the deterioration of the efficiency of use of radio resources when there is little downlink control information to be transmitted in predetermined time resource units such as subframes.

BRIEF DESCRIPTION OF DRAWINGS

FIG. 5 provides diagrams to show examples of distributed mapping of an enhanced PDCCH;

DESCRIPTION OF EMBODIMENTS

Figure 1:
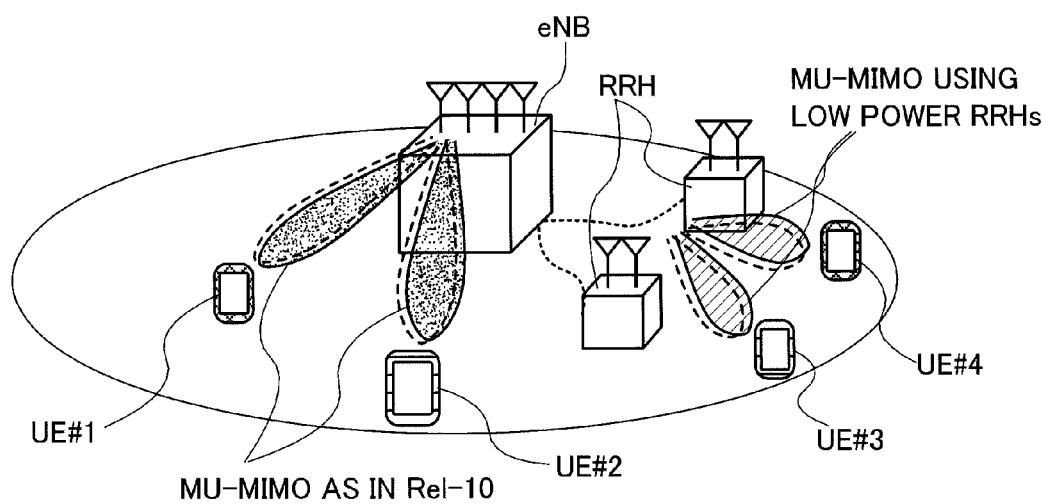
FIG. 1 is a schematic diagram of a HetNet where MU-MIMO is applied.

FIG. 1 is a diagram to show an example of a HetNet where MU-MIMO transmission is applied. The system shown in FIG. 1 is structured in layers, by providing small base stations (for example, RRHs (Remote Radio Heads)) having local coverage areas in the coverage area of a radio base station (for example, eNB (eNodeB)). In downlink MU-MIMO transmission in this system, data for a plurality of user terminal UEs (User Equipment) #1 and #2 is transmitted at the same time from a plurality of antennas of the radio base station. Also, from a plurality of antennas of a plurality of small base stations, data for a plurality of user terminal UEs #3 and #4 is transmitted simultaneously.

Figure 2:
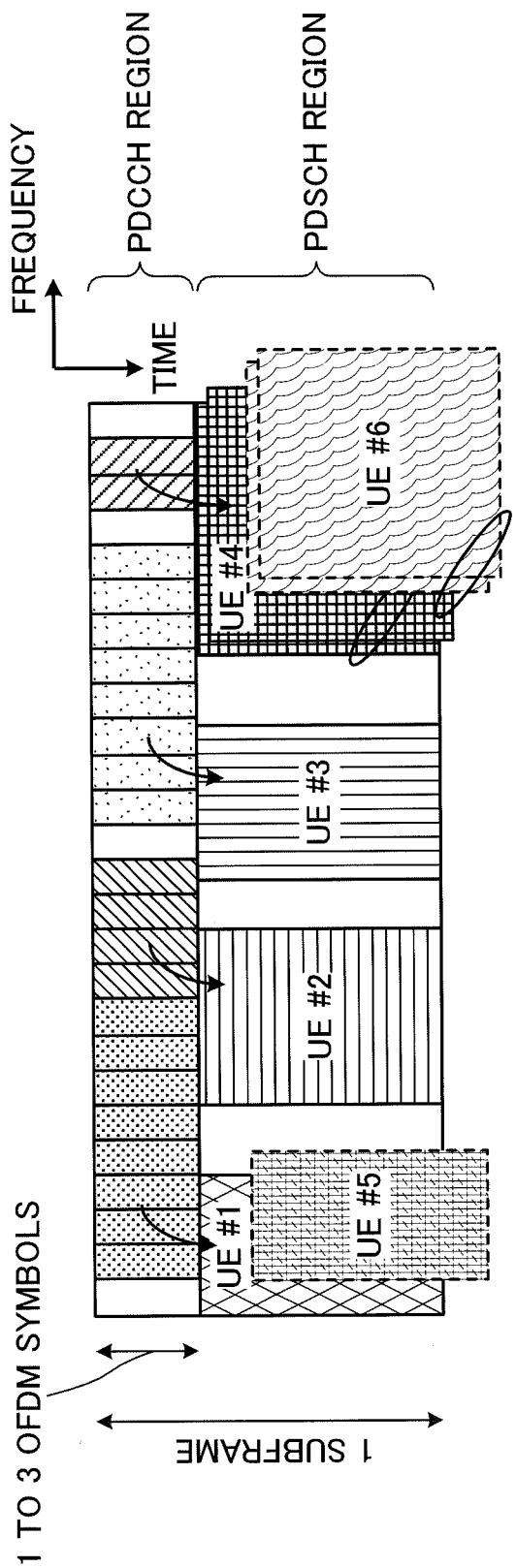
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system where MU-MIMO transmission is applied, in each subframe, a predetermined number of OFDM symbols (covering maximum three symbols) from the top are secured as a radio resource region (PDCCH region) for a downlink control channel (PDCCH: Physical Downlink Control CHannel). Also, a radio resource region (PDSCH region) for a downlink shared data channel (PDSCH: Physical Downlink Shared CHannel) is secured in radio resources following the predetermined number of symbols from the subframe top.

In the PDCCH region, downlink control information (hereinafter referred to as "DCI") for user terminal UEs (here, UEs #1 to #4) is allocated. The DCI includes data allocation information for the user terminal UEs in the PDSCH region. For example, in FIG. 2, user terminal UE #2 receives data for user terminal UE #2 allocated to the PDSCH region based on the DCI for user terminal UE #2 allocated to the PDCCH region.

Also, in MU-MIMO transmission, it is possible to transmit data to a plurality of user terminal UEs in the same time and in the same frequency. Consequently, in the PDSCH region of FIG. 2, it may be possible to multiplex data for user terminal UE #1 and data for user terminal UE #5 over the same frequency region. Similarly, it may also be possible to multiplex data for user terminal UE #4 and data for user terminal UE #6 over the same frequency region.

However, as shown in FIG. 2, even when an attempt is made to allocate data for user terminal UEs #1 to #6 in the PDSCH region, cases might occur where the region for allocating DCI for all of user terminal UEs #1 to #6 cannot be secured in the PDCCH region. For example, in the PDCCH region of FIG. 2, the DCI for user terminal UEs #5 and #6 cannot be allocated. In this case, the number of user terminal UEs to multiplex over the PDSCH region is limited due to the shortage of the PDCCH region for allocating DCI, and therefore there is a threat that it is not possible to achieve, sufficiently, the effect of improving the efficiency of use of radio resources by MU-MIMO transmission.

As a method to solve this shortage of the PDCCH region, it may be possible to expand the PDCCH allocation region outside maximum three OFDM symbols from the top of a subframe (that is, extend the PDCCH region into the conventional PDSCH region from the fourth OFDM symbol onward). As for the method of extending the PDCCH region, there are a method of time-division-multiplexing the PDSCH and the PDCCH in the conventional PDSCH region as shown in FIG. 3A (TDM approach), and a method of frequency-division-multiplexing the PDSCH and the PDCCH in the conventional PDSCH region as shown in FIG. 3B (FDM approach).

Figure 3A:
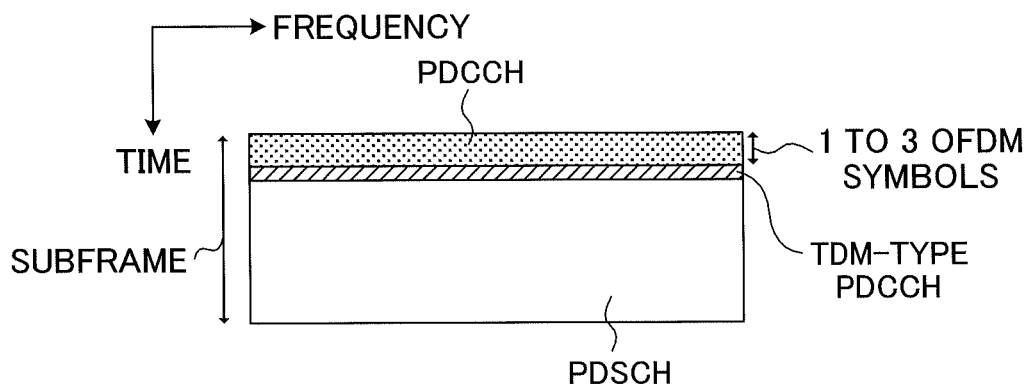
FIG. 3 provides diagrams to explain subframe structures of an enhanced PDCCH.
Figure 3B:
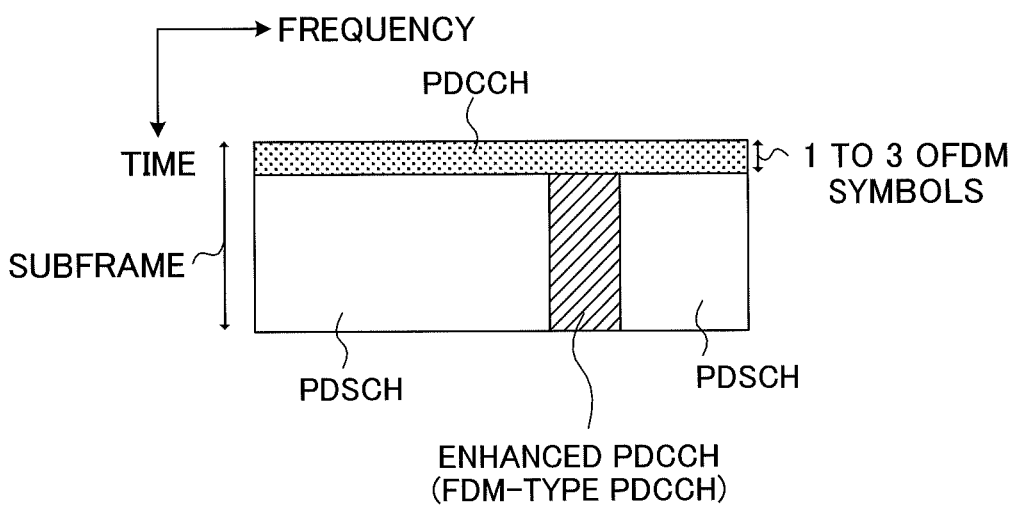

In the TDM approach shown in FIG. 3A, a PDCCH is placed over the entire system band in part of the OFDM symbols from the fourth OFDM symbol in the subframe. Meanwhile, in the FDM approach shown in FIG. 3B, a PDCCH is placed in part of the system band in all of the OFDM symbols from the fourth OFDM symbol in the subframe. This PDCCH, frequency-division-multiplexed with the PDSCH in the FDM approach, is demodulated using a demodulation reference signal (DM-RS), which is a user-specific reference signal. Consequently, DCI that is transmitted in this PDCCH can achieve beam-forming gain, like downlink data that is transmitted in the PDSCH does, and therefore is effective to increase the capacity of the PDCCH. In the future, it is expected that this FDM approach will gain greater importance.

Hereinafter, a PDCCH that is frequency-division-multiplexed with the PDSCH in the FDM approach will be referred to as an "enhanced PDCCH." This enhanced PDCCH may also be referred to as an "enhanced downlink control channel (enhanced physical downlink control channel)," "ePDCCH," "E-PDCCH," "FDM-type PDCCH," "UE-PDCCH," and so on.

Figure 4A:
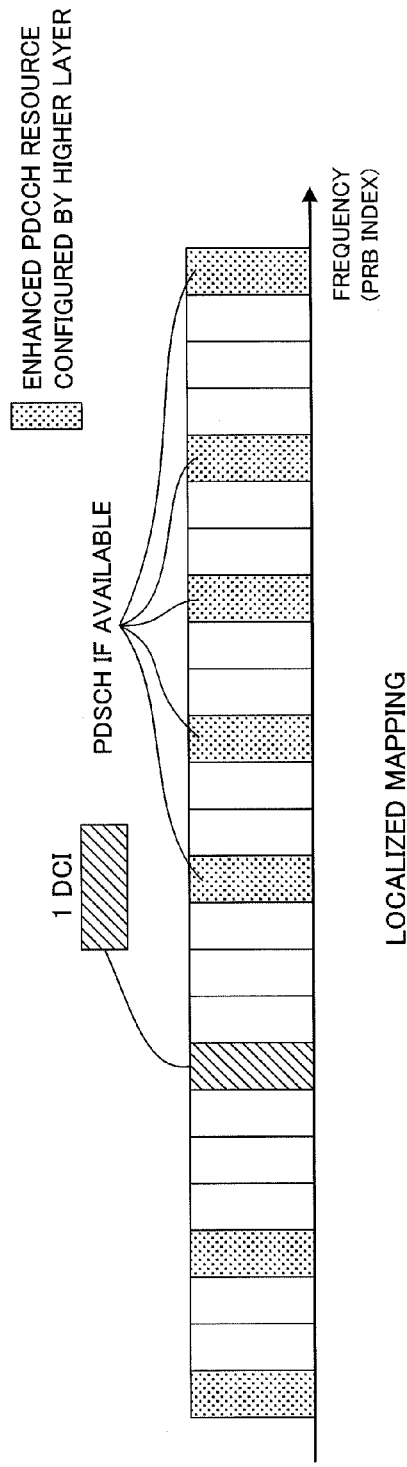
FIG. 4 provides diagrams to explain mapping methods of an enhanced PDCCH.

For enhanced PDCCHs in the FDM approach such as described above, localized mapping and distributed mapping are studied as DCI mapping methods. FIG. 4 provides diagrams to explain mapping methods of DCI in enhanced PDCCHs. FIG. 4A shows localized mapping, and FIG. B shows distributed mapping.

Figure 4B:
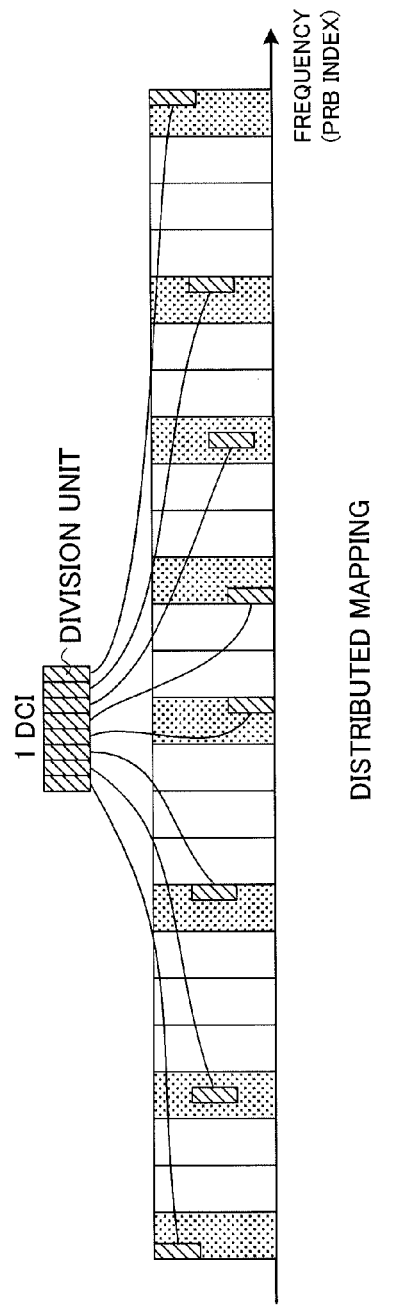

As shown in FIGS. 4A and 4B, enhanced PDCCH resources are comprised of a predetermined number of resource block pairs (hereinafter referred to as "PRB (Physical Resource Block) pairs") that are distributed over the system band. A PRB pair is formed with two PRBs that are consecutive along the time direction, and is identified by a PRB index that is assigned along the frequency direction. A plurality of PRB pairs to constitute enhanced PDCCH resources are determined by a higher layer. The PRB indices to identify each of these plurality of PRB pairs are reported to a user terminal UE through higher layer signaling.

As shown in FIG. 4A, in localized mapping, one piece of DCI is mapped to a specific PRB pair constituting the enhanced PDCCH resources, in a localized manner. To be more specific, one piece of DCI is mapped to one PRB pair (for example, the PRB pair of the best channel quality), based on CQIs fed back from a user terminal UE. Localized mapping can achieve frequency scheduling gain by using CQIs. Note that, in FIG. 4A, among a plurality of PRB pairs constituting the enhanced PDCCH resources, the PDSCH may be mapped to those PRB pairs where no DCI is mapped.

As shown in FIG. 4B, in distributed mapping, one piece of DCI is mapped to a plurality of PRB pairs constituting the enhanced PDCCH resources in a distributed manner. To be more specific, one piece of DCI is divided into a plurality of division units, and each division unit is mapped to the above plurality of PRB pairs (or to all the PRB pairs), in a distributed manner. Distributed mapping can achieve frequency diversity gain by distributing one piece of DCI over the system band.

In this way, in distributed mapping, unlike localized mapping, each piece of DCI is divided into a plurality of division units, and each division unit is mapped to a plurality of PRB pairs constituting the enhanced PDCCH resources in a distributed manner. Consequently, as shown in FIG. 5A, when the enhanced PDCCH resources are formed with many PRB pairs (in FIG. 5A, eight PRB pairs), an attempt to map only one piece of DCI results in deteriorated efficiency of use of radio resources. This is because the division units of one piece of DCI are mapped to many PRB pairs in a distributed manner and the number of PRB pairs where the PDSCH can be mapped decreases.

So, in distributed mapping, as shown in FIG. 5B, limiting the number of PRB pairs where the division units of one piece of DCI are mapped in a distributed manner is under study. In FIG. 5B, the number of PRB pairs where the division units of one piece of DCI are mapped in a distributed manner is limited to four. In FIG. 5B, eight division units of one piece of DCI are mapped in twos to four PRB pairs in a distributed manner. In FIG. 5B, compared with the case shown in FIG. 5A, it is possible to increase the number of PRB pairs where the PDSCH can be mapped.

Figures 6A, 6B:
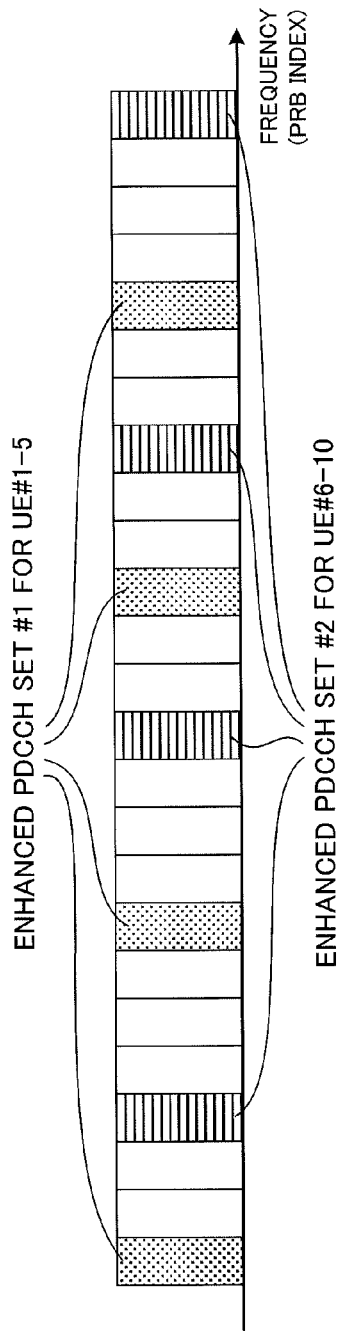
FIG. 6 provides diagrams to show an example of distributed mapping when enhanced PDCCH sets are provided.

FIG. 6 provides diagrams to show an example of distributed mapping when enhanced PDCCH sets are provided. In FIG. 6A, enhanced PDCCH sets #1 and #2 are each formed to include four PRB pairs that are provided for the enhanced PDCCHs. Different four PRB pairs are included between enhanced PDCCH #1 and enhanced PDCCH #2. In FIG. 6A, enhanced PDCCH #1 is allocated to each of user terminal UEs #1 to #5. Meanwhile, enhanced PDCCH #2 is allocated to each of user terminal UEs #6 to #10. That is, in FIG. 6A, one enhanced PDCCH set is allocated to each user terminal UE.

In this case, each user terminal UE blind-decodes one enhanced PDCCH set that is allocated to that user terminal UE. For example, as shown in FIG. 6B, user terminal UE #1 blind-decodes enhanced PDCCH set #1 per aggregation level of enhanced PDCCH resource allocation units. Here, the enhanced PDCCH resource allocation units are formed by dividing a PRB pair using at least one of frequency-division, time-division, and code-division. This resource allocation unit is also referred to as "CCE (Control Channel Element)," "eCCE (enhanced Control Channel Element)," "eREG (enhanced Resource Element Group)," and so on. This resource allocation unit will be hereinafter referred to as "eCCE."

In each enhanced PDCCH set, as shown in FIG. 6B, numbers of candidate search spaces to match eCCE aggregation levels are determined. In FIG. 6B, six candidate search spaces are determined at aggregation levels 1 and 2 (DCI is allocated in one-eCCE units and in two-eCCE units), and two candidate search spaces are determined at aggregation levels 4 and 8 (DCI is allocated in four-eCCE units and in eight-eCCE units). With respect to enhanced PDCCH set #1, user terminal UE #1 blind-decodes a total of sixteen candidate search spaces, which are shown in FIG. 6B, for every possible DCI format. Note that the aggregation levels and the numbers of candidate search spaces of FIG. 6B are simply examples and are by no means limiting.

In FIG. 6A, DCI for each user terminal UE is mapped to a plurality of PRB pairs forming the enhanced PDCCH set allocated to that user terminal UE in a distributed manner. For example, in FIG. 6A, DCI for user terminal UEs #1 to #5 is mapped to four PRB pairs which form enhanced PDCCH set #1 in a distributed manner. Meanwhile, DCI for user terminal UEs #6 to #10 is mapped to four PRB pairs which form enhanced PDCCH set #2 in a distributed manner.

Now, referring to FIG. 6A, a case might occur where, in a given subframe (for example, an arbitrary time resource unit such as 1 ms), DCI for only two user terminal UEs #1 and #6, to which different enhanced PDCCH sets are allocated, is transmitted. In this case, DCI for only user terminal UE #1 is mapped to each PRB pair forming enhanced PDCCH set #1. Similarly, DCI for only user terminal UE #6 is mapped to each PRB pair forming enhanced PDCCH set #2. Consequently, despite the fact that each PRB pair forming enhanced PDCCH sets #1 and #2 has plenty of resources, the number of PRB pairs to which the PDSCH can be mapped decreases, and the efficiency of use of radio resources is deteriorated.

Like this, when one enhanced PDCCH set is allocated to each user terminal UE, there is a problem that cases might occur where, when little DCI is transmitted in a given subframe, the efficiency of use of radio resources is deteriorated. So, the present inventors have studied a DCI mapping method that can prevent the deterioration of the efficiency of use of radio resources even when little DCI is transmitted in a given subframe, and arrived at the present invention.

Now, examples of DCI mapping according to the present embodiment will be described below.

FIRST EXAMPLE

Figures 7A, 7B:
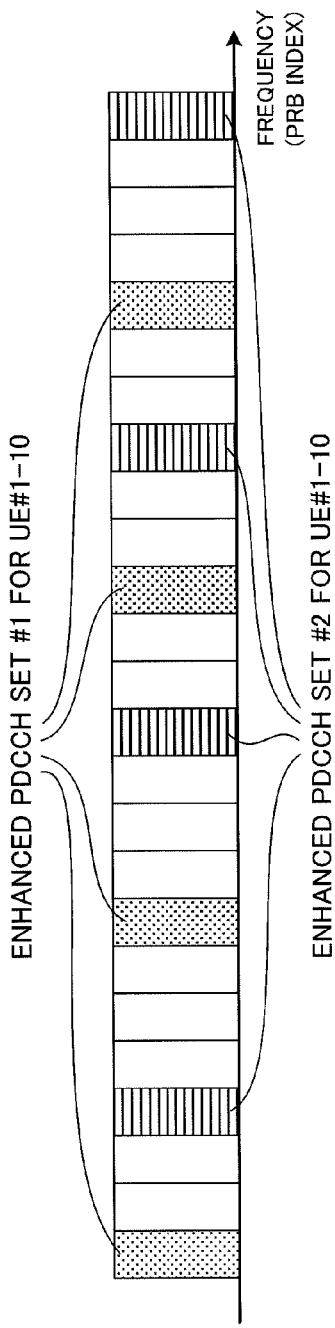
FIG. 7 provides diagrams to show an example of DCI mapping according to a first example of the present invention.

FIG. 7 provides diagrams to show an example of DCI mapping according to a first example of the present embodiment. In FIG. 7A, enhanced PDCCH sets (frequency resource sets) #1 and #2 are each formed to include a predetermined number of PRB pairs (frequency resource units) that are provided for the enhanced PDCCHs. Different PRB pairs are included between PDCCH #1 and PDCCH #2. In FIG. 7A, a plurality of enhanced PDCCH sets #1 and #2 are allocated to user terminal UEs #1 to #10 in an overlapping manner. That is, in FIG. 7A, a plurality of enhanced PDCCH sets #1 and #2 are allocated to each user terminal UE so that at least one enhanced PDCCH set (here, both enhanced PDCCH sets #1 and #2) overlaps with other terminal UEs.

As shown in FIG. 7A, when a plurality of enhanced PDCCH sets are allocated to each user terminal UE to overlap with other user terminal UEs, in a given subframe (for example, an arbitrary time resource unit such as 1 ms), enhanced PDCCH sets are selected so that the number of enhanced PDCCH sets to use to transmit DCI becomes minimum, and the DCI is mapped to the PRB pairs constituting the selected enhanced PDCCH sets.

For example, when transmitting DCI for eight user terminal UEs #1 to #8 in a given subframe, both enhanced PDCCH sets #1 and #2 are selected because one enhanced PDCCH set cannot provide sufficient resources. In this case, DCI for part of the user terminal UEs (for example, user terminal UEs #1 to #4) are mapped to the PRB pairs constituting enhanced PDCCH set #1, and DCI for the rest of the user terminal UEs (for example, user terminal UEs #5 to #8) is mapped to the PRB pairs constituting enhanced PDCCH set #2. In this way, when transmitting DCI for many user terminal UEs, the occurrence of blocking in one of the enhanced PDCCH sets is prevented by using both enhanced PDCCH sets #1 and #2.

On the other hand, when transmitting DCI for two user terminal UEs #1 and #6 in a given subframe, resources do not run short even with only one enhanced PDCCH set. Consequently, only one of enhanced PDCCH sets #1 and #2 is selected so that the number of enhanced PDCCH sets to use to transmit DCI becomes minimum. In this case, DCI for both user terminals #1 and #6 is mapped to the PRB pairs constituting the selected enhanced PDCCH (for example, enhanced PDCCH set #1), and the PDSCH is mapped to the PRB pairs constituting the other enhanced PDCCH set (for example, enhanced PDCCH set #2). As a result, compared with the case shown in FIG. 6A, the number of PRB pairs to which the PDSCH can be mapped increases, and the efficiency of use of radio resources improves in the subframe.

In this way, when a plurality of enhanced PDCCH sets are allocated to each user terminal UE so that at least one enhanced PDCCH set overlaps with other user terminal UEs, enhanced PDCCH sets are selected so that the number of enhanced PDCCH sets to use to transmit DCI in a given subframe becomes minimum. Consequently, when little DCI is transmitted in a given subframe, the number of PRB pairs to which the PDSCH can be mapped decreases, so that it is possible to prevent the deterioration of the efficiency of use of radio resources.

Note that, in FIG. 7A, the DCI mapping method (see FIG. 4) may be changed per enhanced PDCCH set. For example, in enhanced PDCCH set #1, while DCI for one user terminal UE is mapped to a plurality of PRB pairs in a distributed manner, in enhanced PDCCH set #2, DCI for one user terminal UE may be mapped to one PRB pair in a localized manner.

Also, in FIG. 7A, the types of demodulation reference signals (DM-RSs) may be changed per enhanced PDCCH set. Here, the demodulation reference signals (DM-RSs) include UE-specific demodulation reference signals (which will be referred to as "UE-specific DM-RSs") and the demodulation reference signal that is shared between a plurality of user terminal UEs (which will be referred to as "shared DM-RS"). UE-specific DM-RSs are multiplied by beam forming weights that form beams directed to specific user terminal UEs. Consequently, UE-specific DM-RSs are suitable for localized mapping where DCI for a specific user terminal UE is mapped to one PRB pair. Meanwhile, the shared DM-RS is not multiplied by a beam forming weight so that a plurality of user terminal UEs are able to share this shared DM-RS. Consequently, the shared DM-RS is suitable for distributed mapping where DCI for a plurality of user terminal UEs is mapped to one PRB pair.

In this way, the types of DM-RSs vary in accordance with the DCI mapping method, so the DM-RS to apply may be determined per enhanced PDCCH set. For example, when distributed mapping (see FIG. 4B) is applied to enhanced PDCCH set #1, the shared DM-RS is mapped to each PRB pair where DCI is mapped. Also, when localized mapping (see FIG. 4A) is applied to enhanced PDCCH set #2, UE-specific DM-RSs are mapped to each PRB pair where DCI is mapped.

Now, as shown in FIG. 7A, when a plurality of enhanced PDCCH sets are allocated to each user terminal UE, this means that each user terminal UE blind-decodes a plurality of enhanced PDCCH sets. In this case, as shown in FIG. 7B, the number of candidate search spaces per enhanced PDCCH set may be configured not to increase the number of candidate search spaces for a plurality of enhanced PDCCH sets as a whole. By this means, when each user terminal UE blind-decodes a plurality of enhanced PDCCH sets, it is possible to prevent the increase of the number of times of blind decoding, compared to the case of blind-decoding only one enhanced PDCCH set.

For example, in FIG. 7B, the number of candidate search spaces per enhanced PDCCH set at eCCE aggregation levels 1 and 2 is reduced to "3," which is half the number "6" shown in FIG. 6B. Similarly, the number of candidate search spaces per enhanced PDCCH set at aggregation levels 4 and 8 is reduced to "1," which is half the number "2" shown in FIG. 6B. In this case, with respect to enhanced PDCCH sets #1 and #2, each user terminal UE blind-decodes a total of sixteen candidate search spaces, which are shown in FIG. 7B, on a per DCI format basis. That is, the total number of times of blind decoding in each user terminal UE is the same as FIG. 6B. As a result of this, even when the number of enhanced PDCCH sets that each user terminal UE needs to blind-decode increases, it is still possible to prevent the number of times of blind decoding in each user terminal UE from increasing. Note that the aggregation levels and the numbers of candidate search spaces shown in FIG. 7B are simply examples and are by no means limiting.

Note that each enhanced PDCCH set shown in FIG. 7A is simply an example and is by no means limiting. For example, the number of PRB pairs constituting each enhanced PDCCH set is not limited to four, and may be three or less, or five or more. Also, although the PRB pairs to constitute each enhanced PDCCH set are distributed and placed over the entire system band, part of the PRBs may be placed in continuous frequency regions. Also, although, in FIG. 7A, the PRB pairs to constitute enhanced PDCCH sets #1 and #2 are placed alternately along the frequency direction, this is by no means limiting. For example, it is possible to place the PRB pairs constituting one enhanced PDCCH set on the lower frequency side and place the PRB pairs constituting the other enhanced PDCCH set on the high frequency side.

SECOND EXAMPLE

Figures 8A, 8B:
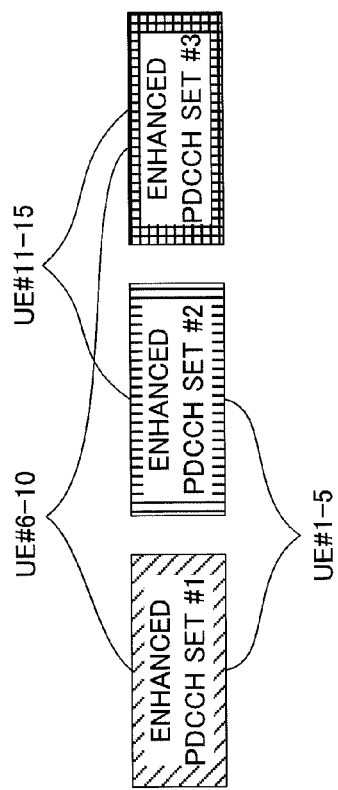
FIG. 8 provides diagrams to show an example of DCI mapping according to a second example of the present invention.

FIG. 8 provides diagrams to show an example of DCI mapping according to a second example of the present embodiment. In FIG. 8A, similar to FIG. 7A, enhanced PDCCH sets #1 to #3 (sets #1 to #3) are each formed to include a predetermined number of PRB pairs that are provided for the enhanced PDCCHs. Although not shown, different PRB pairs are included in each of enhanced PDCCH sets #1 to #3. In FIG. 8A, two enhanced PDCCH sets #x and #y (x≠y) are allocated to each user terminal UE so that at least one enhanced PDCCH set overlaps with other user terminal UEs.

For example, two enhanced PDCCH sets #1 and #2 are allocated to user terminal UE #1. In this case, enhanced PDCCH sets #1 and #2 allocated to user terminal #UE 1 both overlap with enhanced PDCCH sets #1 and #2 allocated to other user terminal UEs #2 to #5. Also, between enhanced PDCCH sets #1 and #2 allocated to user terminal UE #1, one enhanced PDCCH set #1 overlaps with enhanced PDCCH sets #1 and #3 allocated to other user terminal UEs #6 to #10. Similarly, between enhanced PDCCH sets #1 and #2 allocated to user terminal UE #1, one enhanced PDCCH set #2 overlaps with enhanced PDCCH sets #2 and #3 allocated to other user terminal UEs #11 to #15.

As shown in FIG. 8A, when enhanced PDCCH sets #x and #y are allocated to each user terminal UE so that at least one enhanced PDCCH set overlaps with other user terminal UEs, enhanced PDCCH sets are selected so that the number of enhanced PDCCH sets to use to transmit DCI in a given subframe becomes minimum, and DCI for each user terminal UE is mapped to the PRB pairs forming the selected enhanced PDCCH sets.

For example, a case of transmitting DCI for user terminal UEs #1 to #5 and UEs #6 to #10, to which enhanced PDCCH set #1 is allocated in an overlapping manner, in a given subframe, will be considered here. In this case, an attempt to map DCI for all of user terminal UEs #1 to #10 to enhanced PDCCH set #1 alone results in a shortage of resources. Consequently, for example, when DCI for user terminal UEs #1 to #5 is mapped to enhanced PDCCH set #1, DCI for user terminal UEs #6 to #10 is mapped to enhanced PDCCH set #3. In this way, when transmitting DCI for many user terminal UEs, the occurrence of blocking in a specific enhanced PDCCH set is prevented by increasing the number of enhanced PDCCH sets to use to transmit DCI.

Meanwhile, a case of transmitting DCI only for user terminal UEs #1 and #6 to which enhanced PDCCH set #1 is allocated in an overlapping manner in a given subframe will be considered. In this case, when DCI for user terminal UEs #1 and UE #6 is mapped to enhanced PDCCH sets #2 and #3 that are not allocated to user terminal UEs #1 and #6 in an overlapping manner, the efficiency of use of radio resources is degraded in this subframe. Consequently, the DCI for user terminal UEs #1 and #6 is mapped to enhanced PDCCH set #1 that is allocated to user terminal UEs #1 and UE #6 in an overlapping manner. As a result of this, it is possible to allocate two enhanced PDCCH sets #2 and #3 to the PDSCH, so that the efficiency of use of radio resources improves.

In this way, when enhanced PDCCH sets #x and #y are allocated to each user terminal UE so that at least one enhanced PDCCH set overlaps with other user terminal UEs, even when the number of user terminal UEs increases, it is still possible to make the number of enhanced PDCCH sets to use to transmit DCI in a given subframe as small as possible. Consequently, when the number of user terminal UEs increases relatively, it is possible to prevent the degradation of the efficiency of use of radio resources due to decreased number of PRB pairs to which the PDSCH can be mapped.

Note that, also in the case shown in FIG. 8A, the number of candidate search spaces in each of enhanced PDCCH set #x and #y may be reduced, as shown in FIG. 8B. By this means, when each user terminal UE blind-decodes two enhanced PDCCH sets #x and #y, it is possible to prevent the increase of the number of times of blind decoding on the whole, compared to the case of blind-decoding only one enhanced PDCCH set. Note that in FIG. 8B, the aggregation levels and the numbers of candidate search spaces are only examples and are by no means limiting.

Also, the combinations of enhanced PDCCH sets #x and #y shown in FIG. 8A are simply examples and are by no means limiting. For example, in FIG. 8A, four or more enhanced PDCCH sets may be provided. In this case, combinations of two enhanced PDCCH sets out of four or more enhanced PDCCH sets are determined.

THIRD EXAMPLE

Figures 9A, 9B:
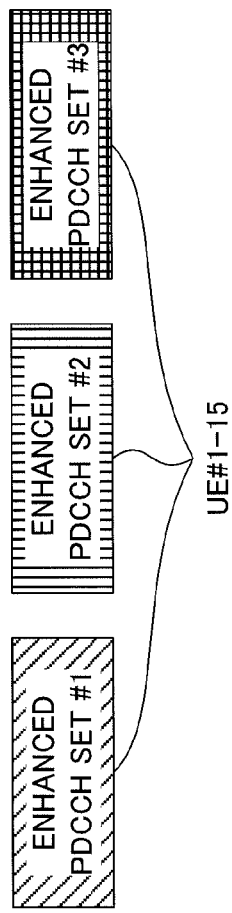
FIG. 9 provides diagrams to show an example of DCI mapping according to a third example of the present invention.

FIG. 9 provides diagrams to show an example of DCI mapping according to a third example of the present embodiment. In FIG. 9A, similar to FIG. 7A, enhanced PDCCH set #1 to #3 (sets #1 to #3) are each formed to include a predetermined number of PRB pairs that are provided for the enhanced PDCCHs. Although not shown, different PRB pairs are included in each of enhanced PDCCH sets #1 to #3. In FIG. 9A, enhanced PDCCH sets #1 to #3 are allocated to user terminal UEs #1 to #15 in an overlapping manner.

That is, in FIG. 9A, maximum three enhanced PDCCH sets #1 to #3 are allocated to each user terminal UE so that all of enhanced PDCCH sets #1 to #3 overlap with other user terminal UEs.

As shown in FIG. 9A, when maximum three enhanced PDCCH sets are allocated to each user terminal UE in an overlapping manner, enhanced PDCCH sets are selected so that the number of enhanced PDCCH sets to use to transmit DCI in a given subframe becomes minimum, and DCI for each user terminal UE is mapped to the PRB pairs constituting the selected enhanced PDCCH sets.

In the case shown in FIG. 9A, DCI for more user terminal UEs can be transmitted in a given subframe, since all of enhanced PDCCH sets #1 to #3 are allocated to each user terminal UE. Also, since overlapping enhanced PDCCH sets #1 to #3 are allocated to each user terminal, DCI for up to a predetermined number of user terminal UEs (for example, five user terminal UEs) has to use only one enhanced PDCCH set. Consequently, when little DCI is transmitted in a given subframe, it is possible to prevent the efficiency of use of radio resources from degrading due to a decreased number of PRB pairs to which the PDSCH can be mapped.

As shown in FIG. 9A, when three enhanced PDCCH sets are allocated to each user terminal UE, each user terminal UE blind-decodes three enhanced PDCCH sets. In this case, as shown in FIG. 9B, the number of candidate search spaces per enhanced PDCCH set may be configured not to increase the number of times of blind decoding for the three enhanced PDCCH sets as a whole. By this means, when each user terminal UE blind-decodes a plurality of enhanced PDCCH sets, it is possible to prevent the increase of the number of times of blind decoding.

For example, in FIG. 9B, the number of candidate search spaces per enhanced PDCCH set at eCCE aggregation levels 1 and 2 is "2," which is one third of "6" in FIG. 6B. Also, the number of candidate search spaces per enhanced PDCCH set at eCCE aggregation levels 4 and 8 is "1" or "0." In this case, with respect to enhanced PDCCH sets #1 to #3, each user terminal UE blind-decodes a total of sixteen candidate search spaces, which are shown in in FIG. 9B, on a per DCI format basis. That is, in FIG. 9B, the total number of times of blind decoding in each user terminal UE is the same as in FIG. 6B. As a result of this, even when the number of enhanced PDCCH sets that each user terminal UE needs to blind-decode increases, it is still possible to prevent the increase of the number of times of blind decoding in each user terminal UE. Note that the aggregation levels and the numbers of candidate search spaces shown in FIG. 9B are simply examples and are by no means limiting.

Note that the enhanced PDCCH sets shown in FIG. 9A are simply examples and are by no means limiting. For example, in FIG. 9A, when the number of user terminals becomes sixteen or more, enhanced PDCCH sets #4 to #6 and so on may be provided anew.

FOURTH EXAMPLE

Figures 10A, 10B:
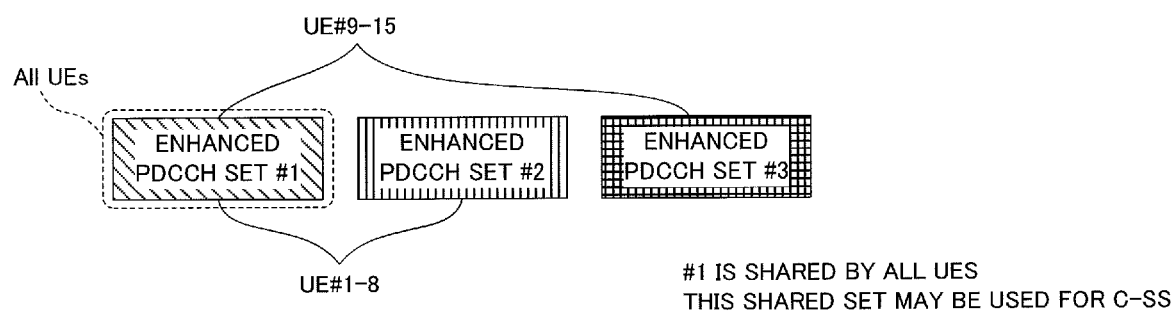
FIG. 10 provides diagrams to show an example of DCI mapping according to a fourth example of the present invention.

FIG. 10 provides diagrams to show an example of DCI mapping according to a fourth example of the present embodiment. In FIG. 10A, similar to FIG. 7A, enhanced PDCCH sets #1 to #3 (sets #1 to #3) are each constituted to include a predetermined number of PRB pairs that are provided for the enhanced PDCCHs. Although not shown, different PRB pairs are included in each of enhanced PDCCH sets #1 to #3. In FIG. 10A, enhanced PDCCH sets #1 and #2 are allocated to each of user terminal UEs #1 to #8. Meanwhile, enhanced PDCCH sets #1 and #3 are allocated to each of user terminal UEs #9 to #15.

Here, enhanced PDCCH set #1 is a primary set (a first frequency resource set) that is allocated to all user terminals UEs #1 to #15 in common. Also, enhanced PDCCH sets #2 and #3 are secondary sets (second frequency resource sets) that are allocated to each user terminal UE separately. That is, in FIG. 10A, a primary set that is common to all user terminal UEs and a secondary set that is user terminal-UE specific are allocated to each user terminal UE.

As shown in FIG. 10A, when a primary set and a secondary set are allocated to each user terminal UE, DCI is preferentially mapped to the PRB pairs forming the primary set. When the resources of the primary set run short, DCI is mapped to the PRB pairs constituting the secondary sets. In this way, by mapping DCI preferentially to the PRB pairs forming the primary set, when little DCI is transmitted in a given subframe, it is possible to prevent the degradation of the efficiency of use of radio resources due to a decreased number of PRB pairs to which the PDSCH can be mapped.

Also, in the case shown in FIG. 10A, each user terminal UE blind-decodes the primary set and the secondary set allocated to that user terminal UE. Here, the primary set is allocated to all the user terminal UEs in common, so that the primary set is blind-decoded by all the user terminal UEs. Consequently, as shown in FIG. 10B, the number of candidate search spaces for the primary set may be configured greater than the number of candidate search spaces for the secondary set. By this means, it is possible to reduce the possibility of occurrence of blocking in the primary set.

For example, in FIG. 10B, the number of candidate primary set search spaces at aggregation levels 1 and 2 is "4," while the number of candidate secondary set search spaces is configured to "2." Note that, in FIG. 10B, the numbers of candidate search spaces for both the primary set and the secondary set at aggregation levels 4 and 8 are configured to "1." However, also at aggregation levels 4 and 8, the number of candidate primary set search spaces may be configured greater than the number of candidate secondary set search spaces, by configuring, for example, the number of candidate search spaces for the primary set to "2" and the number of candidate search spaces for the secondary set to "0." Note that aggregation levels and the numbers of candidate search spaces in FIG. 10B are simply examples and are by no means limiting.

Also, when, for example, the number of users is large and the number of users is divided into two user groups, primary sets may be allocated on a per user group basis. For example, when user terminal UEs #1 to #10 are user group #1 and user terminal UEs #11 to #20 are user group #2, primary sets #1 and #2 may be allocated to each user group.

Also, in FIG. 10A, the primary set is blind-decoded by all user terminal UEs, and therefore is suitable for transmitting common control information (for example, DCI formats 1A and 1C). Consequently, the primary set may be used as a common search space. The indices of eCCEs that form this common search space may be reported to the user terminal UE by a broadcast channel (PBCH: Physical Broadcast CHannel) or may be stored in the user terminal UE in advance.

Note that, when using a primary set as a common search space, common control information (for example, DCI formats 1A and 1C) may be mapped to each PRB pair forming the primary set in a distributed manner (see FIG. 4B). This is because each user terminal UE can achieve frequency diversity gain with respect to the control information.

Also, in FIG. 10B, the secondary sets are blind-decoded by separate user terminal UEs and are therefore suitable for transmitting user-specific UE control information (for example, DCI formats 2, 4, 0 and 3). Consequently, the secondary sets may be used as UE-specific search spaces that are specific per user terminal UE. The indices of eCCEs that constitute these UE-specific search spaces may be reported to the user terminal UE by higher layer signaling.

Note that when using a secondary set as a UE-specific search space, control information (for example, DCI formats 1B and 1D) that is dedicated to a specific user terminal UE may be mapped to one PRB pair constituting the secondary set (see FIG. 4A) in a localized manner. This is because the specific user terminal UE can achieve frequency schedule gain with respect to the dedicated control information.

As has been described above, with the present embodiment, a plurality of enhanced PDCCH sets are allocated to each user terminal UE so that at least one enhanced PDCCH set overlaps with other user terminal UEs. Also, enhanced PDCCH sets are selected so that the enhanced PDCCH sets to use to transmit DCI in a given subframe are made minimum, and DCI is mapped to the PRB pairs that constitute the selected enhanced PDCCH sets. Consequently, when the number of user terminal UEs for which DCI is transmitted in a given subframe is small, it is possible to prevent the degradation of the efficiency of use of radio resources due to a decreased number of PRB pairs to which the PDSCH can be mapped.

Also, with the present embodiment, a plurality of enhanced PDCCH sets may be allocated to each user terminal at separate times. For example, when the number of user terminal UEs is small, only one set may be allocated to each user terminal so that the enhanced PDCCH set overlaps with other user terminal UEs. On the other hand, when the number of user terminal UEs increases, a second set may be allocated to each user terminal UE by higher-layer control information.

Also, with the present embodiment, the maximum number of enhanced PDCCH sets to allocate to each user terminal UE may be determined by specifications or may be reported from the user terminal UE to the radio base station as the UE capability of the user terminal UE.

Note that although the present embodiment has been described so that the frequency resource units to form enhanced PDCCH sets are PRB pairs, this is by no means limiting. Each frequency resource unit may be a PRB, or may be an RBG (Resource Block Group) that is formed with PRBs that are consecutive along the frequency direction. Also, a predetermined time resource unit is not limited to a subframe.

Also, although, with the present embodiment, eCCEs constituted by dividing a PRB pair are shown as an example of an enhanced PDCCH resource allocation unit, this is by no means limiting. For example, eREGs (enhanced Resource Element Groups) constituted by further dividing an eCCE may be used. Also, these enhanced PDCCH resource allocation units may be multiplexed over PRB pairs by using one of time-division-multiplexing, frequency-division-multiplexing, code-division-multiplexing, and space-division-multiplexing, or by using combinations of these.

Now, a radio communication system according to the present embodiment will be described in detail.

Configuration of a Radio Communication System

Figure 11:
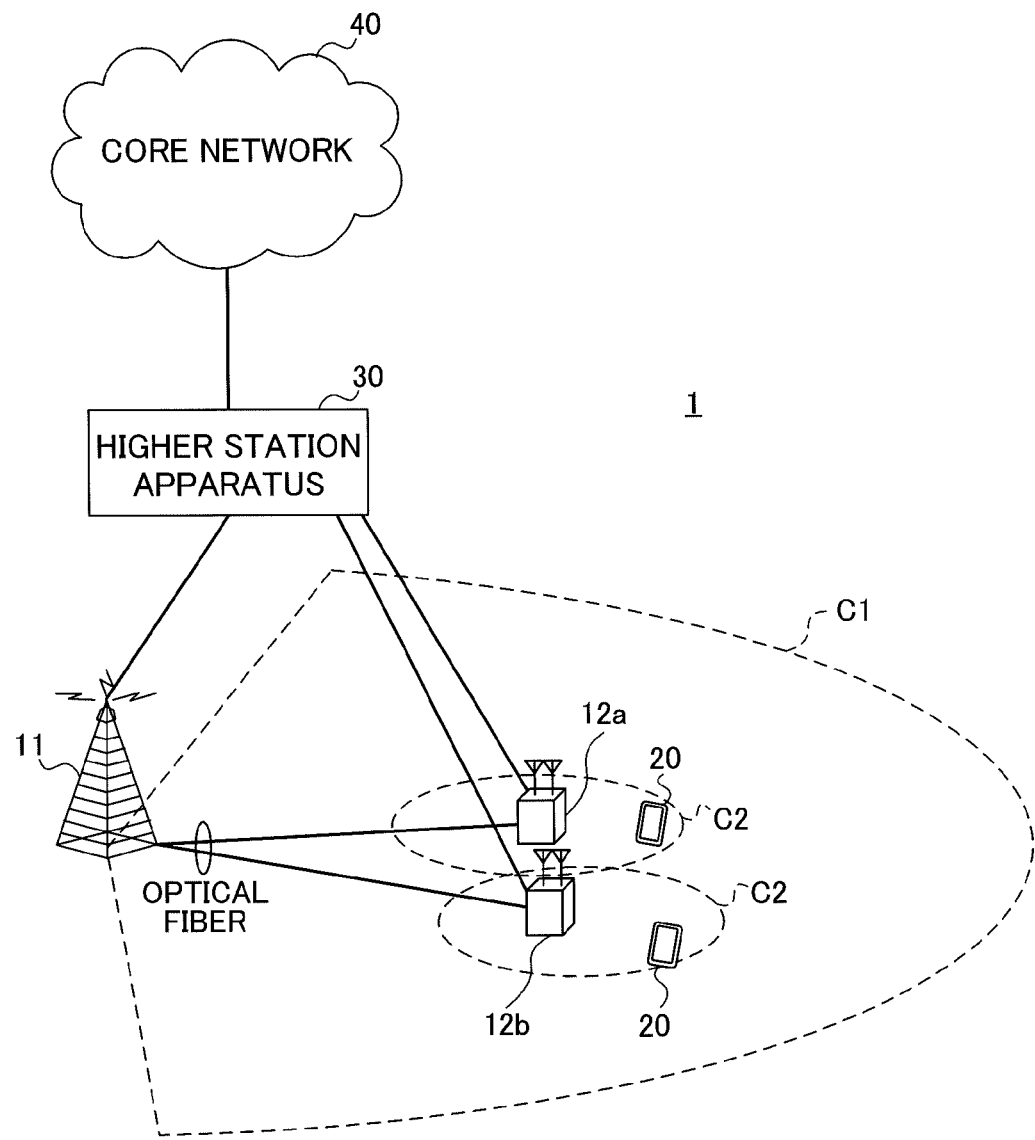
FIG. 11 is a diagram to explain a system structure of a radio communication system according to the present embodiment.

FIG. 11 is a schematic configuration diagram of a radio communication system according to the present embodiment. Note that the radio communication system shown in FIG. 11 is a system to accommodate, for example, the LTE system or SUPER 3G. This radio communication system adopts carrier aggregation to group a plurality of fundamental frequency blocks (component carriers) into one, where the system band of the LTE system constitutes one unit. Also, this radio communication system may be referred to as "IMT-Advanced," "4G," or "FRA (Future Radio Access)" and so on.

As shown in FIG. 11, a radio communication system 1 includes a radio base station 11 that forms a macro cell C1, and radio base stations 12a and 12b that form small cells C2, which are placed inside the macro cell C1 and narrower than the macro cell C1. Also, in the macro cell C1 and in each small cell C2, user terminals 20 are placed. The user terminals 20 are configured to be able to perform radio communication with both the radio base station 11 and radio base stations 12.

Between a user terminal 20 and the radio base station 11, communication is carried out using a carrier of a relatively low frequency band (for example, 2 GHz) and a wide bandwidth (referred to as, for example, "existing carrier," "legacy carrier" and so on). On the other hand, between a user terminal 20 and a radio base station 11, communication is carried out using a carrier of a relatively high frequency band (for example, 3.5 GHz) and a narrow bandwidth (referred to as, for example, "extension carrier," "additional carrier," "capacity carrier" and so on). Also, the radio base station 11 and each radio base station 12 are connected with each other by wire connection or by wireless connection.

The radio base station 11 and each radio base station 12 are connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that, the radio base station 11 is a radio base station having a relatively wide coverage, and may be referred to as "eNodeB," "radio base station apparatus," "transmission point" and so on. Also, the radio base stations 12 are radio base stations having local coverage, and may be referred to as "pico base stations," "femto base stations," "Home eNodeBs," "RRHs (Remote Radio Heads)," "micro base stations," "transmission points" and so on. Also, when no distinction is made between the radio base stations 11 and 12, these will be both referred to as "radio base station 10." Each user terminal 20 is a terminal that supports various communication schemes such as LTE, LTE-A and so on, and may be both a mobile communication terminal and a fixed communication terminal.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands.

Here, communication channels to be used in the radio communication system shown in FIG. 11 will be described. Downlink communication channels include a PDSCH (Physical Downlink Shared Channel), which is used by each user terminal 20 on a shared basis, and downlink L1/L2 control channels (PDCCH, PCFICH and PHICH). User data and higher control information for the PDSCH and the PUSCH and so on is transmitted by the PDCCH (Physical Downlink Control CHannel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel). Also, the scheduling information for the PDSCH and the PUSCH and so on may be transmitted by enhanced PDCCHs (enhanced Physical Downlink Control Channels, also referred to as "ePDCCHs," "E-PDCCHs," "FDM-type PDCCHs" and so on). The enhanced PDCCHs (enhanced downlink control channels) are frequency-division-multiplexed with the PDSCH (downlink shared data channel), and used to cover the shortage of the capacity of the PDCCH.

Uplink communication channels include the PUSCH (Physical Uplink Shared CHannel), which is used by each user terminal 20 as an uplink data channel on a shared basis, and a PUCCH (Physical Uplink Control CHannel), which is an uplink control channel. User data and higher control information are transmitted by this PUSCH. Also, downlink radio quality information (CQI: Channel Quality Indicator), ACK/NACK and so on are transmitted by the PUCCH.

Figure 12A:
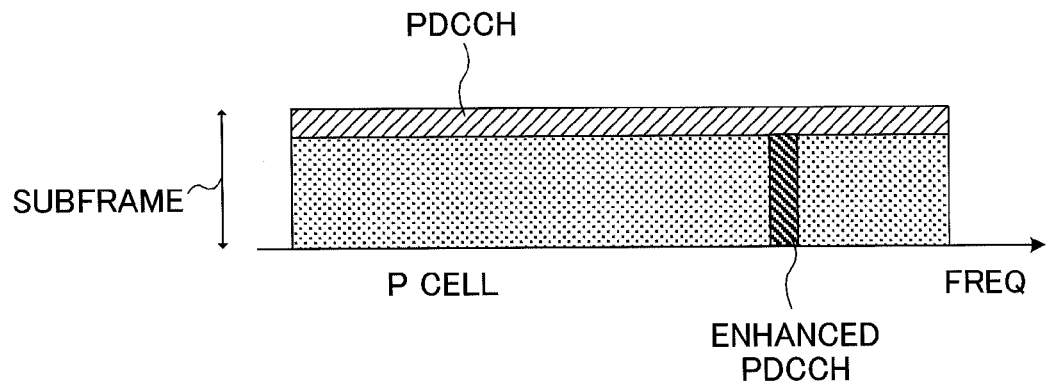
FIG. 12 provides diagrams to explain enhanced PDCCHs used in a radio communication system according to the present embodiment.

The enhanced PDCCH that is used in the radio communication system shown in FIG. 11 will be described in detail with reference to FIGS. 12. FIG. 12A shows an example of a subframe of the radio base station 11, and FIG. 12B and 12C each show an example of a subframe of the radio base stations 12. As shown in FIG. 12A, in the radio base station 11, a PDCCH that is placed over maximum three OFDM symbols from the top of the subframe over the entire system band, and an enhanced PDCCH that is frequency-division-multiplexed with the PDSCH in the fourth OFDM symbol onward in the subframe, are used.

Figure 12B:
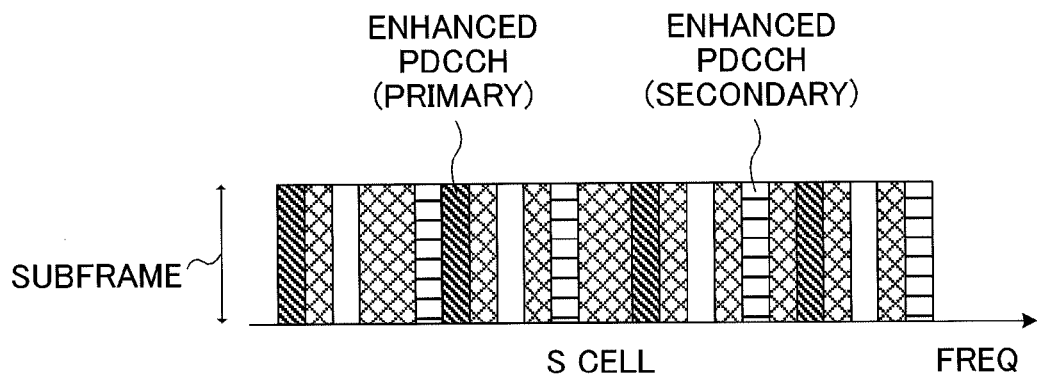
Figure 12C:
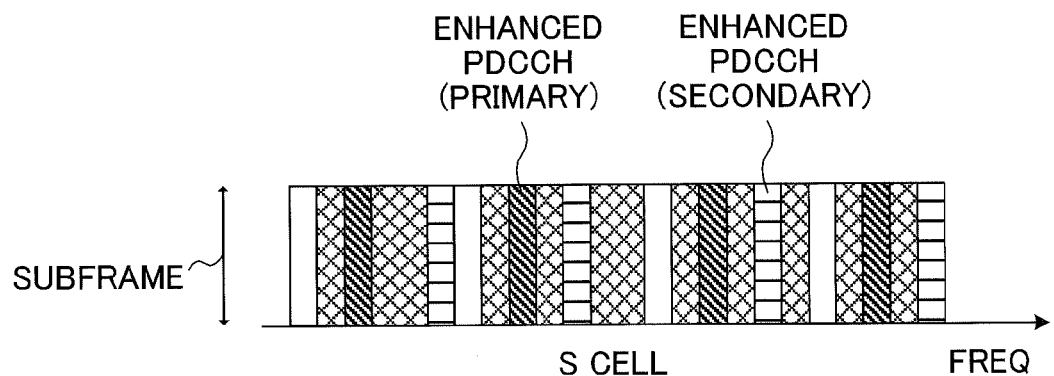

On the other hand, as shown in FIGS. 12B and 12C, the radio base stations 12a and 12b use enhanced PDCCHs that are frequency-division-multiplexed with the PDSCH from the top OFDM symbol of the subframe, and do not use the PDCCH. Note that, as shown in FIGS. 12B and 12C, to prevent interference between the radio base stations 12, in frequency resources where enhanced PDCCHs (primary) are placed in one radio base station 12, muting resources are placed in the other radio base station 12 (see FIG. 12C).

Figure 13:
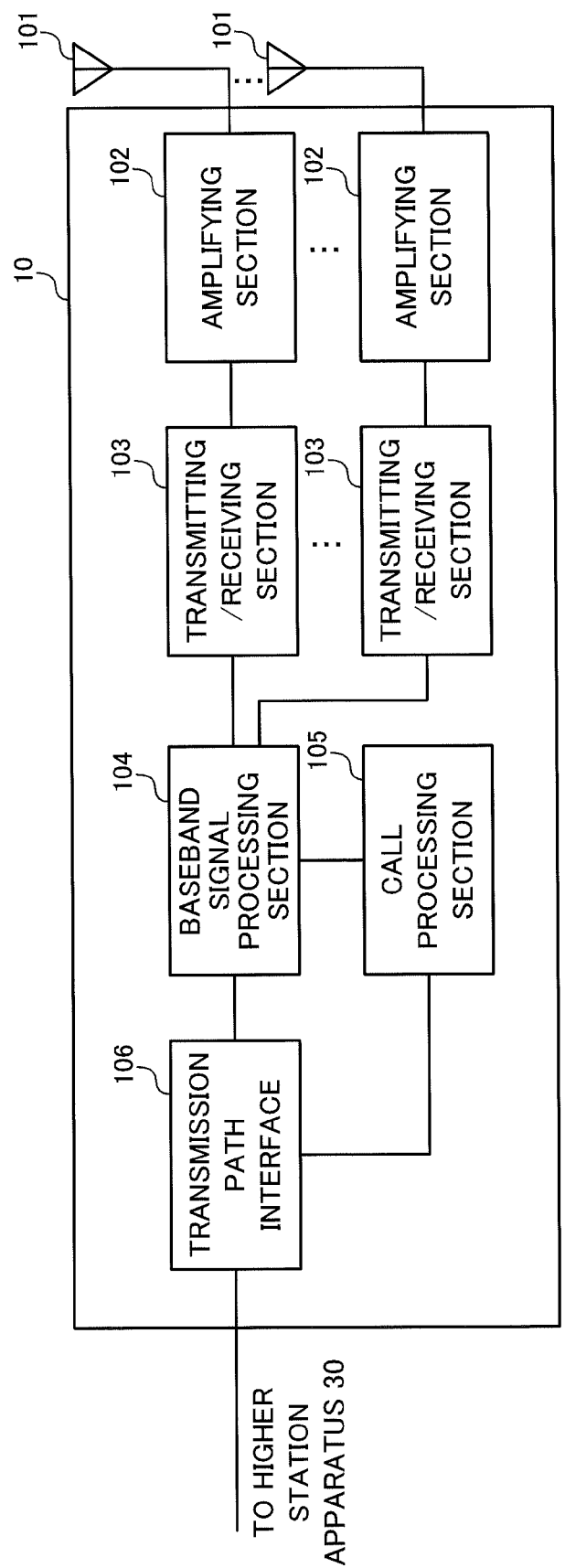
FIG. 13 is a diagram to explain an overall structure of a radio base station according to the present embodiment.

FIG. 13 is a diagram to show an overall structure of a radio base station 10 (which covers the radio base stations 11 and 12) according to the present embodiment. The radio base station 10 includes a plurality of transmitting/receiving antennas 101 for MIMO transmission, amplifying sections 102, transmitting/receiving sections 103, a baseband signal processing section 104, a call processing section 105, and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 203. Furthermore, downlink control channel signals are also subjected to transmission processes such as channel coding and an inverse fast Fourier transform, and are transferred to each transmitting/receiving section 103.

Also, the baseband signal processing section 104 reports, to the user terminals 20, control information for allowing communication in the cell, through a broadcast channel. The information for allowing communication in the cell includes, for example, the uplink or downlink system bandwidth and so on.

Each transmitting/receiving section 103 converts the baseband signals, which have been subjected to precoding and output from the baseband signal processing section 104 on a per antenna basis, into a radio frequency band. The amplifying sections 102 amplify radio frequency signals subjected to frequency conversion, and output the results through the transmitting/receiving antennas 101.

On the other hand, as for data that is transmitted from the user terminal 20 to the radio base station 10 on the uplink, the radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data included in the input baseband signals is subjected to an FFT process, an IDFT process, error correction decoding, a MAC retransmission control receiving process, and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 14:
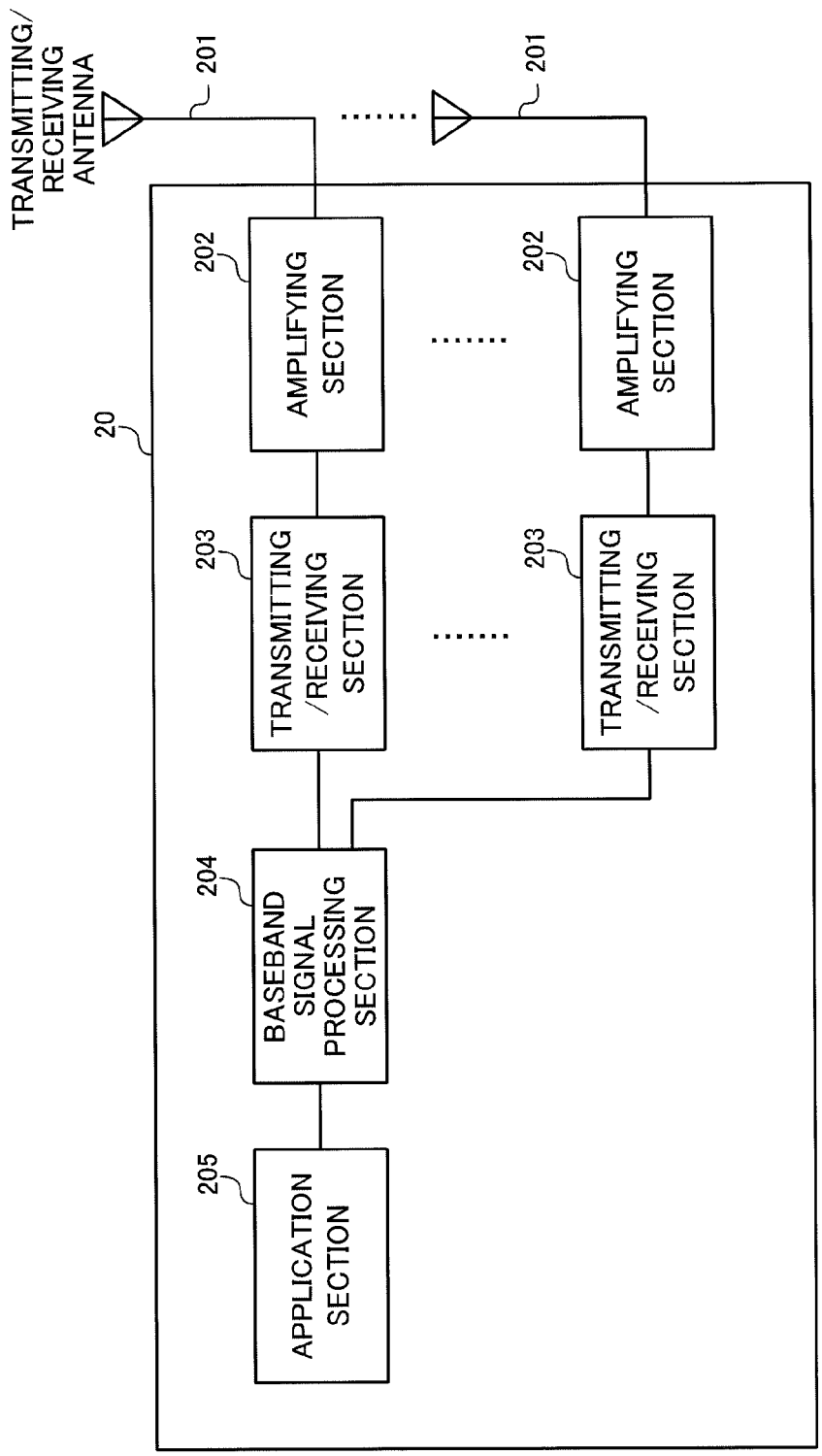
FIG. 14 is a diagram to explain an overall structure of a user terminal according to the present embodiment.

FIG. 14 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204, and an application section 205.

As for downlink data, radio frequency signals that are received in the plurality of transmitting/receiving antennas 201 are each amplified in the amplifying sections 202, and subjected to frequency conversion and converted into baseband signals in the transmitting/receiving sections 203. The baseband signals are subjected to receiving processes such as an FFT process, error correction decoding and retransmission control, in the baseband signal processing section 204. In this downlink data, downlink user data is transferred to the application section 205. The application section 205 performs processes related to higher layers above the physical layer and the MAC layer. Also, in the downlink data, broadcast information is also transferred to the application section 205.

Meanwhile, uplink user data is input from the application section 205 to the baseband signal processing section 204. The baseband signal processing section 204 performs a retransmission control (HARQ (Hybrid ARQ)) transmission process, channel coding, precoding, a DFT process, an IFFT process, and so on, and the result is transferred to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 15:
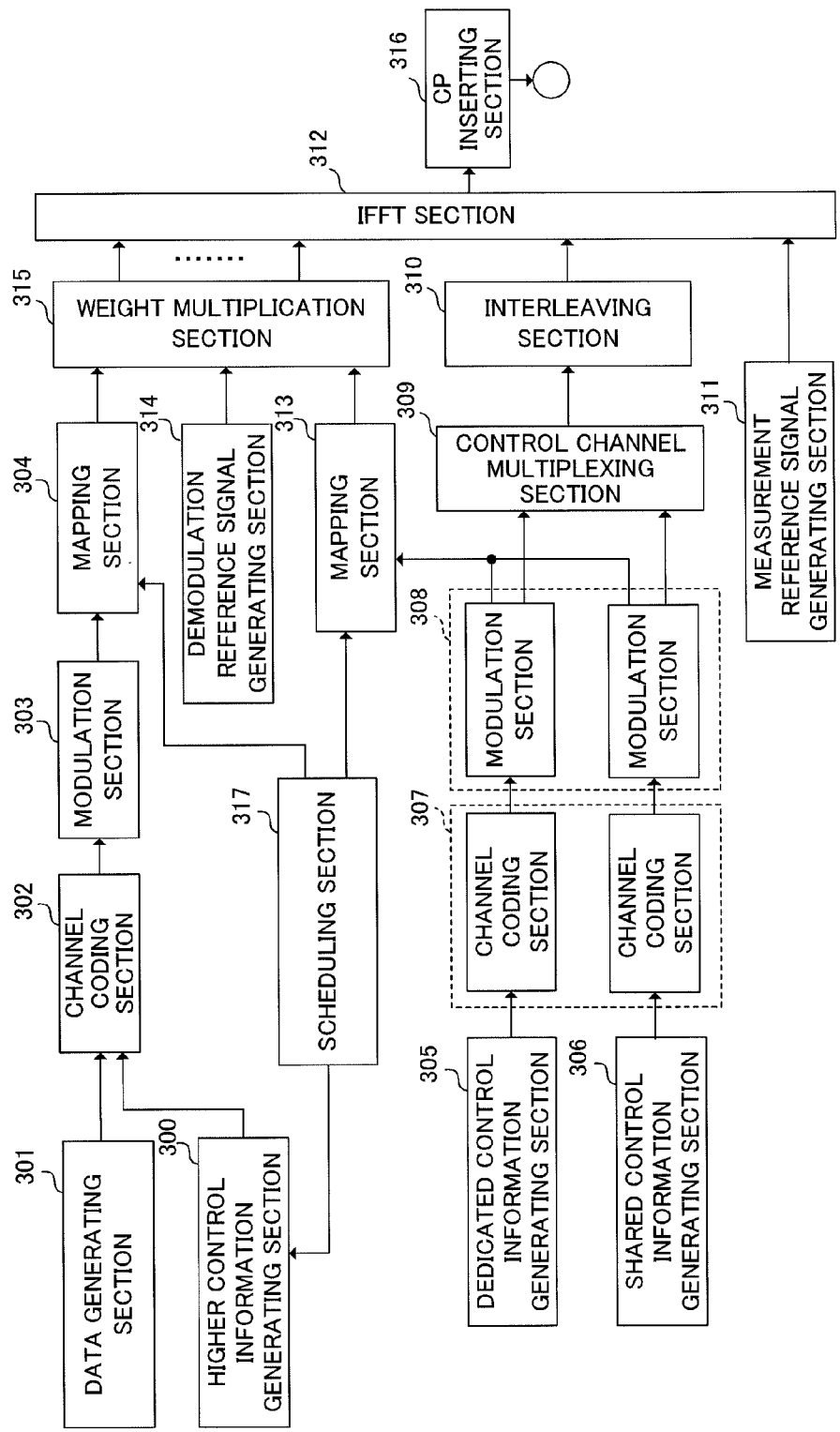
FIG. 15 is a functional configuration diagram of a baseband processing section provided in the radio base station according to the present embodiment, and part of higher layers.

FIG. 15 is a functional configuration diagram of the baseband signal processing section 104 provided in the radio base station 10 according to the present embodiment, and part of higher layers. Note that, although FIG. 15 primarily shows downlink (transmitting) functional configurations, the radio base station 10 may have uplink (receiving) functional configurations as well.

As shown in FIG. 15, the radio base station 10 has a higher layer control information generating section 300, a data generating section 301, a channel coding section 302, a modulation section 303, a mapping section 304, a downlink control information generating section 305, a shared control information generating section 306, channel coding sections 307, modulation sections 308, a control channel multiplexing section 309, an interleaving section 310, a measurement reference signal generating section 311, an IFFT section 312, a mapping section 313, a demodulation reference signal generating section 314, a weight multiplication section 315, a CP inserting section 316, and a scheduling section 317. Note that, when the radio base station 10 is a radio base station 12 to form a small cell C2, the control channel multiplexing section 309 and the interleaving section 310 may be omitted.

The higher layer control information generating section 300 generates higher layer control information on a per user terminal 20 basis. Also, the higher layer control information is control information that is sent through higher layer signaling (for example, RRC signaling) and includes, for example, enhanced PDCCH set allocation information (to be described later). The data generating section 301 generates downlink user data per user terminal 20.

The downlink user data that is generated in the data generating section 301 and the higher layer control information that is generated in the higher layer control information generating section 300 are input in the channel coding section 302 as downlink data to be transmitted in the PDSCH. The channel coding section 302 performs channel coding of the downlink data for each user terminal 20 in accordance with the coding rate determined based on feedback information from each user terminal 20. The modulation section 303 modulates the downlink data having been subjected to channel coding, in accordance with the modulation scheme determined based on feedback information from each user terminal 20. The mapping section 304 maps the modulated downlink data in accordance with commands from the scheduling section 317.

The downlink control information generating section 305 generates UE-specific downlink control information on a per user terminal 20 basis. The UE-specific downlink control information includes PDSCH allocation information (DL grants, DCI formats 1A and 1C and so on), and PUSCH allocation information (UL grants, DCI formats 0 and 4 and so on). The shared control information generating section 306 generates shared (cell-specific) control information that is shared between cells. The cell-shared control information includes, for example, control information for DCI formats 1A and 1.

The downlink control information generated in the downlink control information generating section 305 and the shared control information generated in the shared control information generating section 306 are input in the channel coding sections 307 as downlink control information to be transmitted in the PDCCH or enhanced PDCCHs. The channel coding sections 307 perform channel coding of the downlink control information received as input, in accordance with the coding rate designated by a scheduling section 317, which will be described later. The modulation sections 308 modulate the downlink control information having been subjected to channel coding, in accordance with the modulation scheme designated by the scheduling section 317.

Here, the downlink control information to be transmitted in the PDCCH is input from the modulation sections 308 into the control channel multiplexing section 309 and multiplexed. The downlink control information multiplexed in the control channel multiplexing section 309 is interleaved in the interleaving section 310. The interleaved downlink control information is input to the IFFT section 312 with measurement reference signals (CSI-RSs: Channel State Information-Reference Signals, CRSs: Cell-specific Reference Signals and so on) generated in the measurement reference signal generating section 311.

Meanwhile, the downlink control information that is transmitted in the enhanced PDCCHs is input from the modulation sections 308 into the mapping section 313. The mapping section 313 maps the downlink control information in predetermined allocation units (for example, in eCCE units or in eREG units) in accordance with commands from the scheduling section 317, which will be described later. The mapping section 313 may map the downlink control information using distributed mapping in accordance with commands from the scheduling section 317, or map the downlink control information using localized mapping.

The mapped downlink control information is input in the weight multiplication section 315 with the downlink data transmitted in the PDSCH (that is, the downlink data that is mapped in the mapping section 304) and the demodulation reference signals (DM-RSs) generated in the demodulation reference signal generating section 314. The weight multiplication section 315 multiplies the downlink data to be transmitted by the PDCSH, the downlink control information to be transmitted by the enhanced PDCCHs and the demodulation reference signals, by user terminal 20-specific precoding weights, and pre-encodes them. Also, when using a shared DM-RS, a precoding weight that is common between user terminals is used. The transmission data having been subjected to precoding is input into the IFFT section 312, and converted from frequency domain signals into time sequence signals through an inverse fast Fourier transform. Cyclic prefixes (CPs) to function as guard intervals are inserted in the output signals from the IFFT section 312 by the CP inserting section 316, and the signals are output to the transmitting/receiving sections 103.

The scheduling section 317 schedules the downlink data to be transmitted by the PDSCH, the downlink control information to be transmitted by the enhanced PDCCHs, and the downlink control information to be transmitted by the PDCCH. To be more specific, the scheduling section 317 allocates radio resources based on command information from the higher station apparatus 30 and feedback information from each user terminal 20 (for example, CSI (Channel State Information), which includes CQIs (Channel Quality Indicators) and RIs (Rank Indicators)).

According to the present embodiment, the scheduling section 317 allocates a plurality of enhanced PDCCH sets (frequency resource sets) to each user terminal 20 so that at least part of the enhanced PDCCH sets overlap with other user terminal UEs. As described with reference to FIG. 7A, each enhanced PDCCH set is constituted to include a plurality of PRB pairs (frequency resource units) that are provided for the enhanced PDCCHs, and each PDCCH set is formed with different PRB pairs. Note that, the frequency resource units forming each enhanced PDCCH set are not limited to PRB pairs, and may be PRBs or RBGs. The allocation section and the reporting section of the present invention are configured with this scheduling section 317.

To be more specific, as shown in FIG. 8A, the scheduling section 317 may allocate two enhanced PDCCH sets #x and y, which are allocated such that at least one enhanced PDCCH set overlaps with other user terminal 20, to each user terminal 20. Also, as shown in FIG. 9A, the scheduling section 317 may allocate maximum three enhanced PDCCH sets, which are allocated such that all of the enhanced PDCCH sets overlap with other user terminals 20, to each user terminal 20. Also, as shown in FIG. 10A, the scheduling section 317 may allocate, to each user terminal 20, a primary set (the first frequency resource set) that is allocated to all of the user terminals 20 in common, and, a secondary set (the second frequency resource set) that is allocated to each user terminal 20 separately.

Note that allocation information of a plurality of enhanced PDCCH sets is reported to the user terminals 20 using at least one of higher layer signaling such as RRC signaling or a broadcast channel (PBCH: Physical Broadcast Channel). This allocation information of enhanced PDCCHs may be identification information of the enhanced PDCCH sets (for example, #1 and #2) allocated to the user terminals 20, or may be identification information of the PRB pairs (for example, PRB index numbers) forming the allocated enhanced PDCCH sets.

Also, according to the present embodiment, the scheduling section 317 selects enhanced PDCCH sets from the enhanced PDCCH sets allocated to each user terminal 20 so that the number of enhanced PDCCH sets used to transmit downlink control information (DCI) in a given subframe (for example, an arbitrary time resource unit such as 1 ms) becomes minimum. The scheduling section 317 commands the mapping section 313 to map the downlink control information (DCI) to the PRB pairs constituting the selected enhanced PDCCH sets. The mapping section of the present invention is configured with the scheduling section 317 and the mapping section 313.

Note that the scheduling section 317 may command the mapping section 304 to map the downlink control information using distributed mapping, or may command the mapping section 304 to map the downlink control information using localized mapping. Also, whether or not to use distributed mapping or localized mapping may be changed per enhanced PDCCH set.

Also, the scheduling section 317 may apply localized mapping to the UE-specific control information generated in the downlink control information generating section 305, and may apply distributed mapping to the shared control information generated in the control information generating section 306. This is because localized mapping, which can achieve frequency scheduling gain, is suitable for the UE-specific downlink control information, and distributed mapping, which can achieve frequency diversity gain, is suitable for the shared control information. Note that, when executing localized mapping, the scheduling section 317 may choose the PRB pairs having the best channel quality among the PRB pairs constituting the enhanced PDCCH sets and indicate these to the mapping sections 304 and 313, based on feedback information from each user terminal 20.

Also, the scheduling section 317 may determine the aggregation levels of the resource allocation units (CCEs) for the downlink control information to be transmitted by the PDCCH and the resource allocation units (eCCEs and so on) for the downlink control information to be transmitted by enhanced PDCCHs, based on feedback information from the user terminal 20. Also, as for search spaces where downlink control information can be mapped, the numbers of candidates are determined in advance, per aggregation level of the downlink control information allocation units (CCEs, eCCEs and so on). Consequently, the scheduling section 317 may determine the search spaces from the numbers of candidates determined in advance, and indicate these to the mapping sections 304 and 313.

For example, "4" and "8" are supported as numbers of aggregations of resource allocation units (CCEs and eCCEs) for common search spaces (shared control information), and "1," "2," "4" and "8" are supported as numbers of aggregations of resource allocation units (CCEs and eCCEs) for UE-specific search spaces (UE-specific downlink control information).

Note that, when a plurality of enhanced PDCCH sets are provided, as shown in FIGS. 7B, 8B, 9B and 10B, it is equally possible to configure the number of candidate search spaces at each aggregation level (the number of aggregations) so that the number of candidate search spaces for the plurality of enhanced PDCCH sets as a whole does not increase. Also, as shown in FIG. 10B, when a primary set and a secondary set are provided, the number of candidate search spaces for the primary set greater than the number of candidate search spaces for the secondary set.

Also, the allocation information of candidate search spaces such as described above may be reported to the user terminal 20 using higher layer signaling such as RRC signaling, or may be reported to the user terminal 20 via a broadcast channel (PBCH: Physical Broadcast Channel). Here, the allocation information of candidate search spaces includes, for example, PRB index numbers that represent the positions of candidate search spaces.

Figure 16:
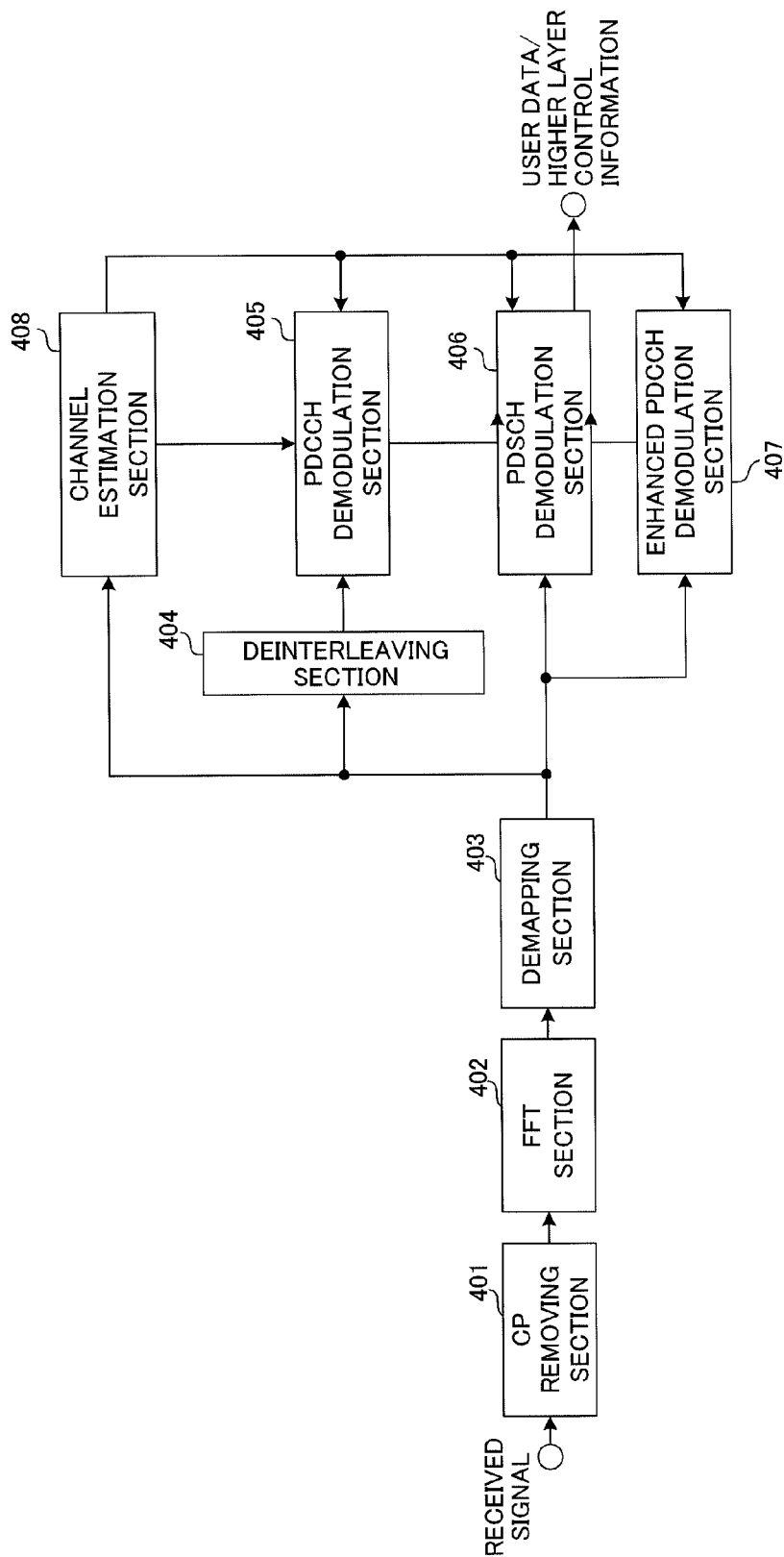
FIG. 16 is a functional configuration diagram of a baseband processing section of a user terminal according to an embodiment.

FIG. 16 is a functional configuration diagram of the baseband signal processing section 104 provided in the user terminal 20. Note that, although FIG. 16 primarily shows downlink (receiving) functional configurations, the user terminal 20 may have uplink (transmitting) functional configurations as well. The user terminal 20 has a CP removing section 401, an FFT section 402, a demapping section 403, a deinterleaving section 404, a PDCCH demodulation section 405, a PDSCH demodulation section 406, an enhanced PDCCH demodulation section 407 and a channel estimation section 408, as downlink functional configurations.

Downlink signals received from the radio base station 10 as received data have the cyclic prefixes (CPs) removed in the CP removing section 401. The downlink signals, from which the CPs have been removed, are input in the FFT section 402. The FFT section 402 performs a fast Fourier transform (FFT) on the downlink signals, converts the time domain signals into frequency domain signals, and inputs these signals in the demapping section 403. The demapping section 403 demaps the downlink signals. Note that the demapping process by the demapping section 403 is performed based on higher layer control information that is received as input from the application section 205. Downlink control information that is output from the demapping section 403 is deinterleaved in the deinterleaving section 404.

The PDCCH demodulation section 405 performs blind decoding, demodulation, channel decoding and so on of the downlink control information (DCI) output from the deinterleaving section 404, based on the result of channel estimation in a channel estimation section 408, which will be described later. To be more specific, the PDCCH demodulation section 405 blind-decodes the candidate search spaces reported from the radio base station 10 in advance or the candidate search spaces determined in advance, and acquires the downlink control information. For example, the PDCCH demodulation section 405 blind-decodes the common candidate search spaces reported by the broadcast channel, and acquires the shared control information. Also, the PDCCH demodulation section 405 blind-decodes the UE-specific candidate search spaces that are reported as higher layer control information, and acquires the UE-specific downlink control information.

The PDSCH demodulation section 406 performs demodulation and channel decoding and so on of the downlink data output from the demapping section 403, based on the result of channel estimation in the channel estimation section 408, which will be described later. To be more specific, the PDSCH demodulation section 406 demodulates the PDSCH that is allocated to the user terminal based on the demodulated downlink control information (for example, downlink scheduling information such as DL grants) demodulated in the PDCCH demodulation section 405 or in the enhanced PDCCH demodulation section 407, and acquires the downlink data (downlink user data and higher layer control information) for this user terminal.

The enhanced PDCCH demodulation section 407 performs blind decoding, demodulation and channel decoding and so on of output from the demapping section 403, based on the result of channel estimation in the channel estimation section 408, which will be described later. To be more specific, the enhanced PDCCH demodulation section 407 blind-decodes the candidate search spaces reported in advance from the radio base station 10, and acquires the downlink control information. For example, the enhanced PDCCH demodulation section 407 blind-decodes the common candidate search spaces reported through the broadcast channel, and acquires the shared control information. Also, the enhanced PDCCH demodulation section 407 blind-decodes the UE-specific candidate search spaces reported as higher layer control information, and acquires the UE-specific downlink control information.

With the present embodiment, the enhanced PDCCH demodulation section 407 blind-decodes the candidate search spaces of a plurality of enhanced PDCCH sets based on the allocation information reported from the radio base station 10, and acquires the DCI for this user terminal. As has been described above, the enhanced PDCCH sets where the DCI is mapped are selected by the radio base station 10 so that the enhanced PDCCH sets used to transmit DCI in a given subframe become minimum.

Note that, when a plurality of enhanced PDCCH sets are reported from the radio base station 10 like this, as shown in FIGS. 7B, 8B, 9B and 10B, the number of candidate search spaces at each aggregation level (the number of aggregations) may be configured so that the number of candidate search spaces for the plurality of enhanced PDCCH sets as a whole does not increase. Also, as shown in FIG. 10B, when a primary set and a secondary set are provided, the number of candidate search spaces for the primary set greater than the number of candidate search spaces for the secondary set.

The channel estimation section 408 performs channel estimation using demodulation reference signals (DM-RSs), measurement reference signals (CRSs and CSI-RSs) and so on. The channel estimation section 408 outputs the result of channel estimation by the measurement reference signals (CRSs and CSI-RSs) to the PDCCH demodulation section 405. Meanwhile, the channel estimation section 408 outputs the result of channel estimation by the demodulation reference signals (DM-RSs) to the PDSCH demodulation section 406 and the enhanced PDCCH demodulation section 407. By means of this demodulation using user terminal 20-specific demodulation reference signals (DM-RSs), it is possible to achieve beam-forming gain with respect to the PDSCH and enhanced PDCCHs.

As has been described above, with the radio communication system 1 according to the present embodiment, the radio base station 10 allocates a plurality of enhanced PDCCH sets to each user terminal 20 so that at least one enhanced PDCCH set overlaps with other user terminals 20. Also, the radio base station 10 selects enhanced PDCCH sets so that the enhanced PDCCH sets to use to transmit DCI in a given subframe become minimum, and maps DCI to the PRB pairs that constitute the selected enhanced PDCCH sets. Consequently, when the number of user terminal UEs for which DCI is transmitted in a given subframe is small, it is possible to prevent the degradation of the efficiency of use of radio resources due to a decreased number of PRB pairs to which the PDSCH can be mapped.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-107921, filed on May 9, 2012, including the specification, drawings and abstract, is incorporated herein by reference in its entirety.

The invention claimed is:

1. A user terminal that receives downlink control information from a radio base station by an enhanced downlink control channel which is frequency-division-multiplexed with a downlink shared data channel, the user terminal comprising:
   a receiving section configured to receive allocation information of a plurality of frequency resource sets each including a plurality of physical resource block (PRB) pairs placed for the enhanced downlink control channel; and
   an acquisition section configured to decode search space candidates for a given frequency resource set based on the allocation information to acquire the downlink control information,
   wherein a number of search space candidates per frequency resource set is configured such that a total number of search space candidates for the plurality of frequency resource sets as a whole is equal to or less than a given value,
   wherein the plurality of frequency resource sets are two frequency resource sets, and
   wherein the downlink control information is mapped in a distributed manner to PRB pairs that constitute one of the two frequency resource sets, and the downlink control information is mapped in a localized manner to PRB pairs that constitute another frequency resource set.

2. The user terminal according to claim 1, wherein the receiving section receives, as the allocation information, information of PRB pairs that constitute an allocated frequency resource set.

3. The user terminal according to claim 1, wherein the receiving section receives the allocation information using at least one of higher layer signaling and a broadcast channel.

4. The user terminal according to claim 1, wherein the number of search space candidates per frequency resource set is configured such that the total number of search space candidates for the two frequency resource sets defined at respective aggregation levels is equal to or less than 16.

5. A radio communication method for a user terminal receiving downlink control information from a radio base station by an enhanced downlink control channel which is frequency-division-multiplexed with a downlink shared data channel, the radio communication method comprising:
receiving allocation information of a plurality of frequency resource sets each including a plurality of physical resource block (PRB) pairs placed for the enhanced downlink control channel; and
decoding search space candidates for a given frequency resource set based on the allocation information to acquire the downlink control information,
wherein a number of search space candidates per frequency resource set is configured such that a total number of search space candidates for the plurality of frequency resource sets as a whole is equal to or less than a given value,
wherein the plurality of frequency resource sets are two frequency resource sets, and
wherein the downlink control information is mapped in a distributed manner to PRB pairs that constitute one of the two frequency resource sets, and the downlink control information is mapped in a localized manner to PRB pairs that constitute another frequency resource set.

6. A radio base station that transmits downlink control information to a user terminal by an enhanced downlink control channel which is frequency-division-multiplexed with a downlink shared data channel, the radio base station comprising:
an allocation section configured to control allocation to the user terminal of a plurality of frequency resource sets each including a plurality of physical resource block (PRB) pairs placed for the enhanced downlink control channel;
a transmitting section configured to transmit, to the user terminal, allocation information of the plurality of frequency resources sets; and
a mapping section configured to map the downlink control information to a plurality of PRB pairs that constitute a given frequency resource set allocated to the user terminal,
wherein a number of search space candidates per frequency resource set is configured such that a total number of search space candidates for the plurality of frequency resource sets as a whole is equal to or less than a given value,
wherein the plurality of frequency resource sets are two frequency resource sets, and
wherein the downlink control information is mapped in a distributed manner to PRB pairs that constitute one of the two frequency resource sets, and the downlink control information is mapped in a localized manner to PRB pairs that constitute another frequency resource set.

7. A radio communication system comprising:
a radio base station that transmits downlink control information by an enhanced downlink control channel which is frequency-division-multiplexed with a downlink shared data channel; and
a user terminal that receives the downlink control information from the radio base station, wherein
the radio base station comprises a transmitting section configured to transmit, to the user terminal, allocation information of a plurality of frequency resources sets each including a plurality of physical resource block (PRB) pairs placed for the enhanced downlink control channel,
the user terminal comprises a receiving section configured to receive the allocation information and an acquisition section configured to decode search space candidates for a given frequency resource set based on the allocation information to acquire the downlink control information, and
a number of search space candidates per frequency resource set is configured such that a total number of search space candidates for the plurality of frequency resource sets as a whole is equal to or less than a given value,
wherein the plurality of frequency resource sets are two frequency resource sets, and
wherein the downlink control information is mapped in a distributed manner to PRB pairs that constitute one of the two frequency resource sets, and the downlink control information is mapped in a localized manner to PRB pairs that constitute another frequency resource set.

* * * * *